United States Patent [19]

Endo et al.

[11] Patent Number: 5,801,504
[45] Date of Patent: Sep. 1, 1998

[54] CONTROL APPARATUS FOR ELECTRIC POWER STEERING SYSTEM

[75] Inventors: Shuji Endo; Yusuke Itakura; Hideyuki Kobayashi, all of Maebashi, Japan

[73] Assignee: NSK Ltd., Tokyo, Japan

[21] Appl. No.: 713,105

[22] Filed: Sep. 16, 1996

[30] Foreign Application Priority Data

Sep. 25, 1995 [JP] Japan ............... 7-269041
Sep. 25, 1995 [JP] Japan ............... 7-269042

[51] Int. Cl.$^6$ .................. H02P 7/14; B62D 5/04
[52] U.S. Cl. ............... 318/434; 318/432; 318/293; 318/294; 388/811
[58] Field of Search ............... 318/138, 245, 318/254, 280–293, 430–466; 388/811; 180/446

[56] References Cited

U.S. PATENT DOCUMENTS

| | | | |
|---|---|---|---|
| 4,719,396 | 1/1988 | Shimizu | 318/432 |
| 4,735,271 | 4/1988 | Shimizu | 108/79.1 |
| 5,202,830 | 4/1993 | Tsurumiya et al. | 364/424.05 |
| 5,404,960 | 4/1995 | Wada et al. | 180/79.1 |
| 5,444,622 | 8/1995 | Takeshima et al. | 364/424.05 |
| 5,504,679 | 4/1996 | Wada et al. | 364/424.05 |
| 5,569,991 | 10/1996 | Matsuoka et al. | 318/286 |
| 5,574,344 | 11/1996 | Matsuoka et al. | 318/293 |
| 5,631,833 | 5/1997 | Wada et al. | 364/424.052 |
| 5,652,487 | 7/1997 | Nishino et al. | 318/434 |
| 5,675,699 | 10/1997 | Yamamoto et al. | 388/811 |

FOREIGN PATENT DOCUMENTS

| | | |
|---|---|---|
| 3-182874 | 8/1991 | Japan . |
| 5-10270 | 2/1993 | Japan . |

OTHER PUBLICATIONS

*Unofficial English language Abstract of Item A12.*

*Primary Examiner*—Paul Ip
*Attorney, Agent, or Firm*—Brinks Hofer Gilson & Lione

[57] ABSTRACT

A control apparatus for an electric power steering system assures stability of the feedback control and control generation of noise from the control circuit when the steering wheel automatically returns to the neutral position by means of the self-aligning torque in order to improve the feeling of the steering operation. In the motor driving circuit connecting four semiconductor elements in the shape of H bridge, the semiconductors of the first arm are driven by the duty ratio D1 while the semiconductors of the second arm are driven by the duty radio D2 defined by the function of the duty ratio D1 (D2 is longer in time than D1).

10 Claims, 25 Drawing Sheets

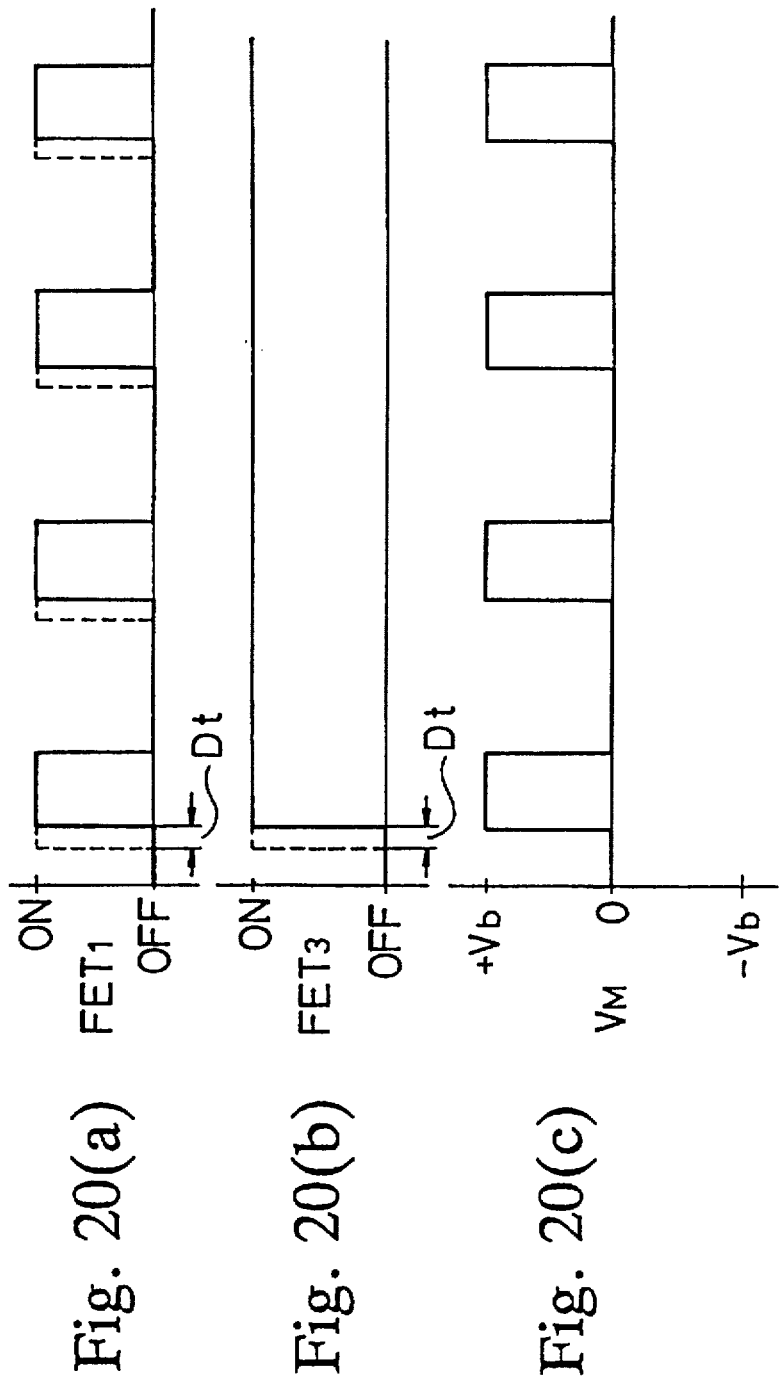

CONTROL APPARATUS FOR ELECTRIC POWER STEERING SYSTEM

BACKGROUND OF THE INVENTION

1. Field of the Invention

The present invention relates to a control apparatus for electric power steering system.

2. Description of the Prior Art

A certain kind of electric power steering system for vehicle is intended to assist the manual steering operation by detecting a steering torque and others generated on a steering shaft when a steering wheel is operated, calculating a steering force assisting command value which is a control target value of a motor on the basis of a detected signal and obtaining a difference, as a current control value, between the steering assisting command value which is the control target value explained above and the detected value of the motor current to drive the motor with the current control value.

In such an electrical power steering system, an H bridge circuit comprising a first arm ($FET_1$ and FET4) and a second arm (FET2 and FET3) formed by bridge connection of four field effect transistors FET1 to FET4 is constituted as shown in FIG. 27 and the power supply is connected across the input terminals while the motor M explained above is connected across the output terminals to form a motor control circuit.

An amplitude of the motor current can be controlled by driving FET1 of the first arm (or FET2 of the second arm) among a pair of FETs forming two arms provided opposed with each other in the H bridge circuit forming the motor control circuit with a PWM signal (pulse width modulation signal) having the duty ratio D determined on the basis of the current control value.

Moreover, a rotating direction of the motor M can be controlled by controlling FET3 of the second arm to ON and FET4 of the first arm to OFF (or FET3 of the second arm to OFF and FET4 of the first arm to ON) on the basis of the sign of the current control value.

When FET3 is in the conductive state, a current flows through FET1, motor M and FET3 and a positive current flows into the motor M. When FET4 of the second arm is in the conductive state, a current flows through FET2, motor M and FET4 and a negative current flows into the motor M.

This motor control circuit is widely used because the FETs on the same arm are never driven simultaneously and thereby the arm has a lower possibility of short-circuit, thus resulting in higher reliability (refer to the Japanese Patent Laid-Open No. Hei 5-10270, as an example).

FIG. 28 shows a relationship between the motor current (a current actually flowing into the motor and is different from the detected current i) and the PWM signal and a duty ratio D. That is, when a steering torque is generated because the steering wheel is operated, a relationship between the motor current I and a duty ratio D changes as indicated by a line (a) in FIG. 28, a steering force assisting command value Iref which is the control target value of the motor is calculated on the basis of the detected signal of the manual steering torque in the control circuit and a current control value E which is a difference between the steering force assisting command value Iref and the detected value I of the motor current to be fed back is outputted to the motor drive circuit. Thereby, the duty ratio D for controlling semiconductor elements in the motor drive circuit takes a certain value, never resulting in a particular problem.

However, when the steering handle is returned to the straight running position with a self-aligning torque after the steering wheel is operated (hereinafter referred to as when the steering wheel is returned to the initial position), since the manual steering torque is not generated, the steering assisting force command value Iref which is the control target value of motor becomes zero but an inverse electromotive force is generated in the motor. Accordingly, the relationship between the motor current I and duty radio D changes upward only by a value (g) corresponding to the back electromotive force as indicated by the line (b) in FIG. 28, generating a discontinuous area in the relationship between the motor current I and the duty ratio D at the area where the value of the duty ratio D becomes zero.

Meanwhile, a feedback control circuit tries to calculate a current control value E but since there is no duty ratio D corresponding to the steering force assisting command value Iref, an oscillating current having the amplitude almost corresponding to the discontinuous area of the motor current I is outputted as the current control value E as shown by the line (c) in FIG. 28.

Generation of such oscillating current will become a noise generation source and also a cause to interfere stability of feedback control.

In the case of drive by the H bridge circuit explained above, if the duty ratio D becomes lower than a certain value, a dead zone (f) is generated to cause disappearance of the motor current as shown in FIG. 29 due to the relationship of the motor current for the duty ratio of the PWM signal.

However, the electric power steering system introduces a mechanism for making feedback control for the motor current to follow the steering force assisting command value which is the control target value of the motor current calculated on the basis of the detected signal such as a steering torque or the like. Thereby, a motor current can be generated, not resulting in any particular problem, in accordance with the steering force assisting command value in the area where the motor current is comparatively higher even if the dead zone (f) explained above exists.

However, if the steering handle is operated a little when the steering wheel is set at the position near the neutral position (straight running position) and if the calculated duty ratio is in the dead zone (f) not permitting the motor current to flow when the duty ratio is calculated corresponding to the steering force assisting command value because only a little change is generated in such steering force assisting command value, the motor current does not follow the change of the steering force assisting command value to result in a delay of the generating of the steering assisting force and the steering feeling may be deteriorated. FIG. 30 shows a relationship between the steering force assisting command value and motor current under this condition, suggesting that the motor current i is delayed from the steering force assisting command value I.

FIG. 31 simultaneously shows the discontinuous area (g) in the relationship between the motor current I and duty ratio D generated at the area near the point where the duty ratio D is zero and the dead zone (f) where the motor current does not flow when the duty ratio D is less than a certain value.

These figures suggest that when width of the dead zone (f) of the motor current for the duty ratio D of the PWM signal is enlarged, that is, the line (a) indicating the relationship between the duty ratio D and motor current i in such a condition that the motor does not rotate is moved to the right side in FIG. 31 in order to reserve stability of the feedback control system and to suppress generation of noise, the line (b) indicating the relationship between the duty ratio D when the steering wheel is returned to the initial position (motor is rotating) and the motor current i also shifts to the right side, making a discontinuous area (g) to effectively control generation of the oscillation current. However, in this case, width of the dead zone (f) is widened.

Therefore, requested here is such a contradictory requirement that width of the dead zone is reduced to improve feeling of the steering operation at the area near the neutral position of the steering wheel but width is widened to control generation of oscillation current and noise when the steering wheel is returned to the initial position.

SUMMARY OF THE INVENTION

It is therefore a principal object of the present invention to provide a novel control apparatus for electric power steering system which has improved stability of the motor control system under the various running conditions and feeling of steering operation while the steering wheel is operated gradually.

It is another object of the present invention to provide a novel control apparatus for electric power steering system which has improved the stability of the feedback control system constituting a motor control system while the steering wheel is returned to the straight running position (initial position) with a self-aligning torque generated on the basis of the characteristic of the steering mechanism and has suppressed the generation of noise when the steering wheel is returned to the initial position.

It is another object of the present invention to provide a novel control apparatus for electric power steering system which has improved feeling of the steering operation in the gradual operation when the steering wheel is set to the position near the straight running position.

Other objects of the present invention will become apparent from the following detail explanation with reference to the accompanying drawings.

BRIEF DESCRIPTION OF THE DRAWINGS

FIGS. 20(a), 20(b), and 20(c) are diagrams for explaining an estimated value of the motor terminal voltage having compensated for time lag (when duty ratio is always 1 ($D_2$=1)).

DETAILED DESCRIPTION OF THE PREFERRED EMBODIMENTS

Figure 28:
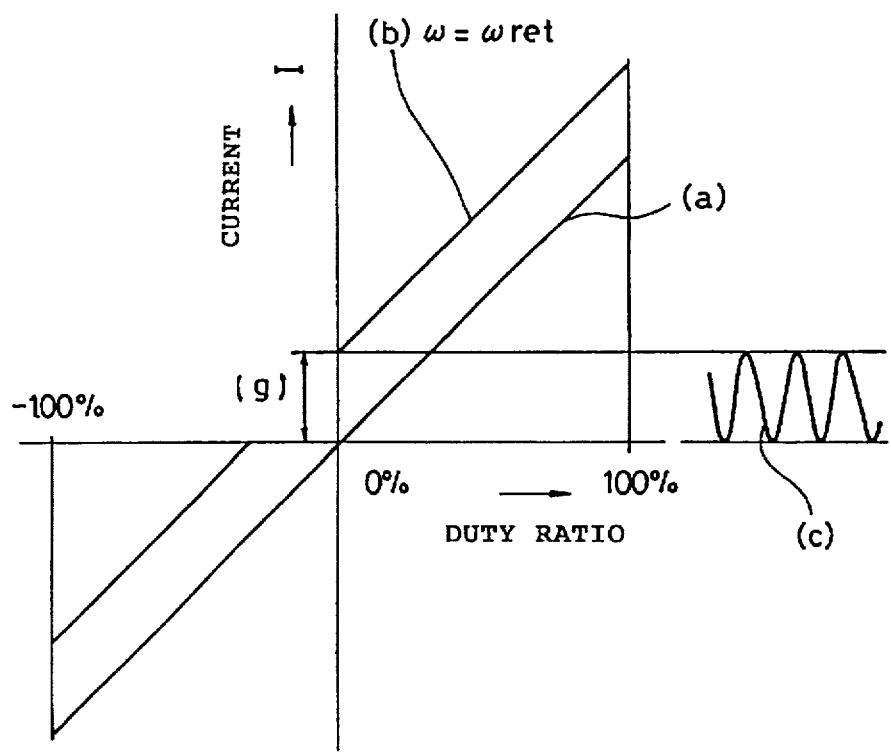
FIG. 28 is a diagram for explaining a relationship between the motor current and duty ratio of PWM signal in the conventional motor control circuit.
Figure 29:
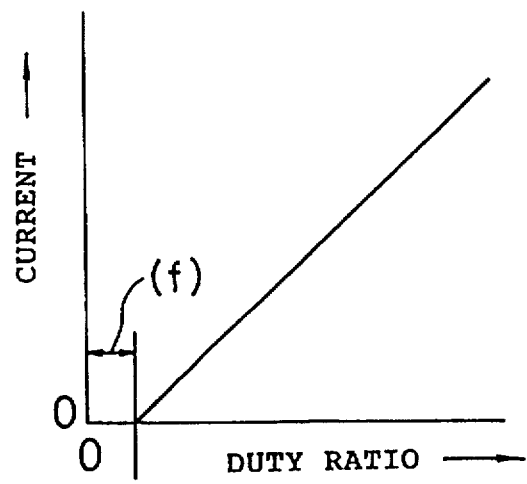
FIG. 29 is a diagram for explaining the dead zone where a motor current does not flow, in the relationship of the motor current for the duty ratio of PWM signal in the conventional motor control circuit.
Figure 30:
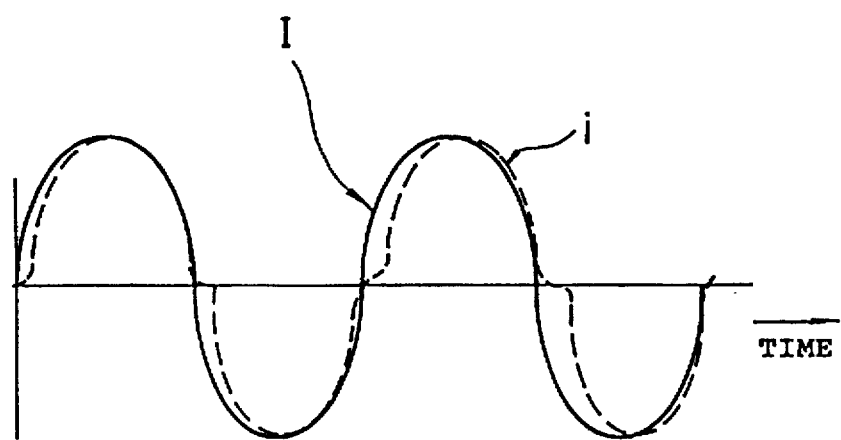
FIG. 30 is a diagram for explaining a relationship between the steering force assisting command value and motor current when the steering wheel is set at the position near the neutral position in the conventional motor control circuit.

The basic concept of the present invention will be explained first. As explained previously in regard to FIG. 28, since the steering torque is not yet generated in the steering wheel returning condition that the steering wheel which is once operated is returned to the straight running position with a self-aligning torque, the steering force assisting command value Iref which is a control target value of the motor becomes zero but since an inverse electromotive force is generated in the motor, a relationship between the motor current I and duty ratio D moves upward in the value as much as the inverse electromotive force as shown by the line (b) in FIG. 28. As a result, a discontinuous area (g) is generated in the relationship between the motor current I and duty ratio D at the area near the position where the duty ratio D becomes zero, an oscillation current having the amplitude almost corresponding to the discontinuous area of the motor current I and thereby generation of noise and other problems may occur.

Figure 1:
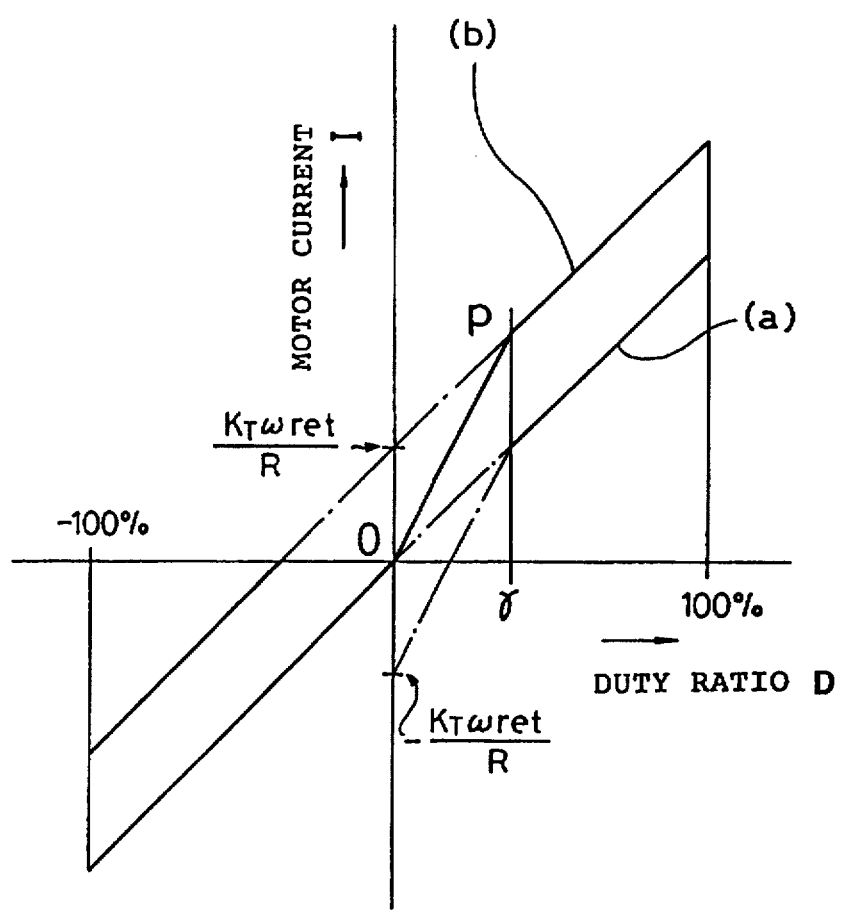
FIG. 1 is a diagram for explaining a relationship between a motor current I and a duty ratio D of the PWM signal in a motor control circuit of the present invention.

Accordingly, the present invention has solved the problems by controlling the relationship between the motor current I and the duty ratio D to eliminate the discontinuous area thereof to make continuous the relationship therebetween, that is, to make continuous between the point P indicating the motor current I when the duty radio D=γ on the line (b) and the origin O indicating the relationship between the motor current I and duty radio D when the steering wheel is returned as shown in FIG. 1.

In more practical, in the area where the duty ratio D is small, FET1 is driven by duty ratio D1 and simultaneously FET3 and FET4 are driven with the PWM signal having the duty ratio D2 defined by the primary function of the duty ratio D1 explained above.

In the area where the duty ratio D1 is larger than γ, the conventional driving method, that is, the control method where FET3 (or FET4) is controlled for ON or OFF depending on the current direction is introduced.

Here, the case where FET3 (or FET4) is not controlled to be kept at ON (or OFF) depending on the rotating direction of the motor determined by the sign of the PWM signal but is driven together with FET1 (or FET2) with the different duty ratio will be discussed.

Figure 2:
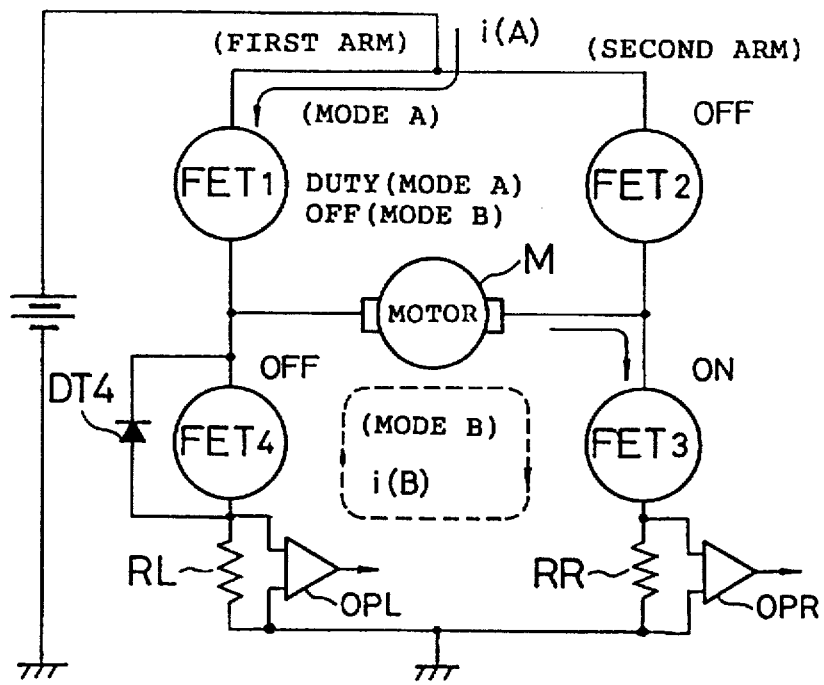
FIG. 2 is a diagram for explaining operation when FET1 and FET3 are driven simultaneously with different duty ratios (mode A and mode B).
Figure 3:
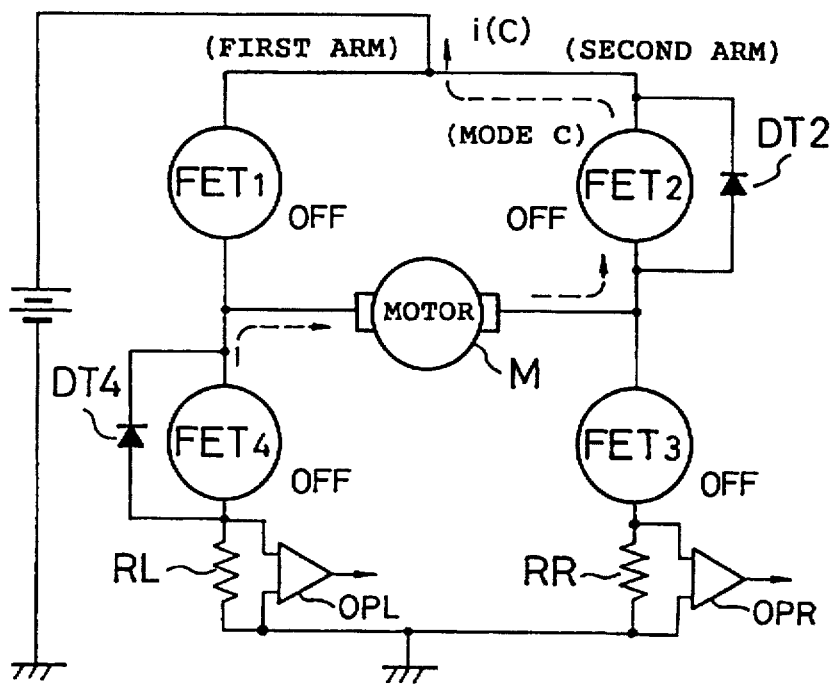
FIG. 3 is a diagram for explaining operation when FET1 and FET3 are driven simultaneously with different duty ratios (mode C).

FIG. 2 and FIG. 3 are diagrams for explaining operations when FET1 and FET3 are driven simultaneously with different duty ratios and FIGS. 4(a) to 4(e) are diagrams for explaining the operating conditions of FETs when FET1 of the first arm and FET3 of the second arm are driven simultaneously with different duty ratios D and the relationship among the motor terminal voltage VM, value Ri obtained by subtracting influence of motor back electromotive force $K_T\omega$ from the motor terminal voltage VM and the motor current I.

Here, it is assumed that FET1 is driven by the duty ratio D1, FET3 is driven by the duty ratio D2 which is larger (namely, longer in time) than the duty ratio D1 of FET1, and FET2 and FET4 are maintained at OFF state. FIGS. 4(a) and 4(b) indicate the ON/OFF states for the time of FET1 and FET3.

In this case, the motor terminal voltage VM changes as shown in FIG. 4(c). Namely, when both FET1 and FET3 are in the ON state (this mode is called the mode A) (refer to FIG. 2), a battery voltage Vb is applied across the terminals of motor M. Next, when FET1 is in the OFF state, while FET3 is in the ON state (this mode is called the mode B) (refer to FIG. 2), the terminal voltage of the motor M becomes zero.

Moreover, when both FET1 and FET3 are in the OFF state (this mode is called the mode C) (refer to FIG. 3), a negative battery voltage −Vb is applied across the terminals of the motor M. Namely, in the mode C, since both FET1 and FET3 are in the OFF state, a current circuit of [resistor $R_L$]→[recovery diode DT4 added to FET4]→[motor M]→[recovery diode DT2 added to FET2]→[power supply] is formed to the motor M as shown in FIG. 3 and the terminal voltage VM of the motor M becomes equal to a negative battery voltage −Vb.

When both FET1 and FET3 are simultaneously driven with different duty ratios to set the equilibrium condition of the motor current, if the period of PWM signal is sufficiently shorter than the electric time constant of the motor, the motor current I may be approximated by the following equation (1).

$$I=\{(D1+D2-1)\cdot Vb/R\}-K_T\omega/R \tag{1}$$

Where,

D1: Duty ratio;

D2: Duty ratio;

Vb: Battery voltage;

R: Motor resistance between terminals;

$K_T$: Back electromotive force constant of motor;

ω: Angular velocity of motor;

Here, when the duty ratio D2 is defined as the continuous function of the duty radio D1 such as D2=f(D1) and the function f is defined to obtain I=0 when ω=ωret, D1=0, continuity may be given between the duty ratio D and motor current I within the range of $0 \leq \omega \leq \omega\text{ret}$.

Here, as an example of the function f, following linear functional equation (2) can be defined.

$$D2=a\cdot D1+b \tag{2}$$

Where, a, b are constants.

In order to obtain the constants a, b, following conditions are first set up.

(1) When duty ratio D1=γ, duty ratio D2=1 (100%),
   Where, γ is a value set freely.

(2) When duty ratio D1=0 and ω=ωret, I=0

Where, ω is an angular velocity of motor, ωret is an angular velocity of motor when the steering wheel is returned freely.

The condition (1) is necessary to determine the position of the point p on the line (b) when the duty ratio D1=γ in FIG. 1 and matches with the ordinary driving condition.

Meanwhile, the condition (2) is necessary to determine that the line (b) passes the origin O in FIG. 1. Therefore, the linear function connecting the point P and the origin O can be determined by obtaining the constants a and b satisfying the above conditions.

In the region where the duty ratio D1 is larger than γ, the existing driving method can be introduced so that FET3 (or FET4) is controlled for ON or OFF depending on the current direction.

The constants a, b satisfying the above conditions are expressed by the following equations (3) and (4).

$$a=-K_T\omega\text{ret}/\gamma Vb \tag{3}$$

$$b=1+K_T\omega\text{ret}/Vb \tag{4}$$

In this case, a motor current I can be expressed by the following equation (5) which has been obtained by substituting the equation (2) to D2 of the equation (1) and then substituting the constants a, b determined by the equations (3) and (4).

$$I=Vb/R\{1-(K_T\omega ret/\gamma Vb)\}\cdot D1-K_T/R(\omega ret-\omega) \quad (5)$$

According to the equation (5), a relationship between the motor current I and duty ratio D does not show any discontinuous area even in the region where the angular velocity of motor ω is smaller than the angular velocity of motor ωret when the steering wheel is returning.

Namely, the duty ratio D1 may be changed continuously for the motor current I even in the region where the motor angular velocity ω is smaller than the motor angular velocity ωret when the steering wheel is returning by driving FET1 with the duty ratio D1, while FET3 with the duty ratio D2 which is different from D1, simultaneously.

In above explanation, the duty ratio D2 is processed as the linear function of the duty ratio D1, but the method is not limited thereto and any function may be defined so long as it satisfies the boundary conditions explained above.

Next, the detection of motor current and estimation of motor angular velocity from a motor terminal voltage and motor current in the present invention will be explained.

When a motor rotates, it generates a back electromotive force. There is a following relationship among the inverse electromotive force of motor, motor terminal voltage and motor current.

$$VM=(Ls+R)I+K_T\omega \quad (6)$$

Where,

VM: Motor terminal voltage;

I: Motor current;

L: Motor inductance;

s: Laplace operator;

R: Motor resistance between terminals;

$K_T$: Back electromotive force constant of motor;

ω: Angular velocity of motor;

Therefore, the motor angular velocity ω may be expressed by the following equation (7).

$$\omega=1/K_T\{VM-(Ls+R)I\} \quad (7)$$

Figure 4:
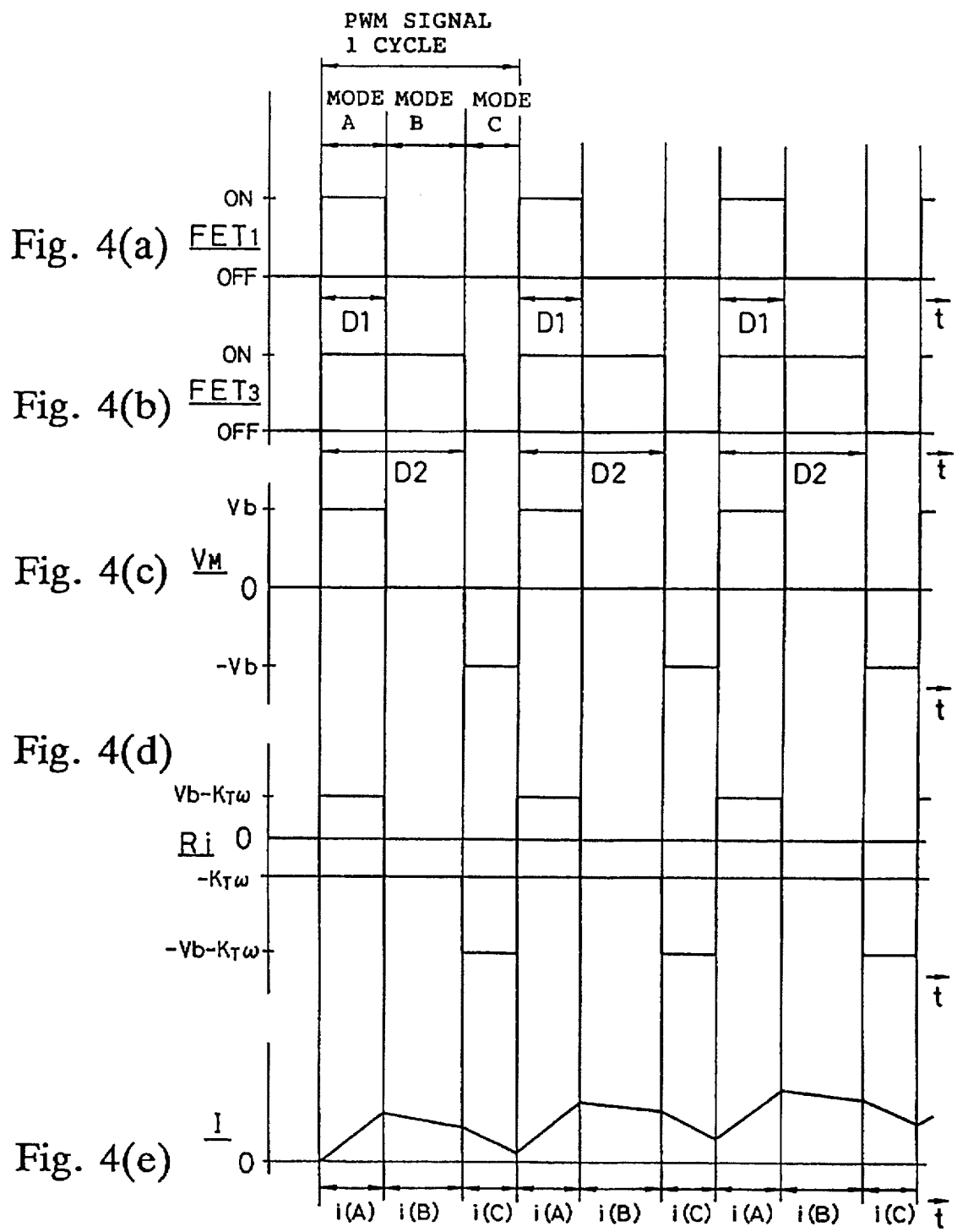
FIGS. 4(a), 4(b), 4(c), 4(d) and 4(e) are diagrams for explaining operating conditions of FETs and a relationship between a motor terminal voltage VM and a motor current I.

Therefore, estimation of motor current I and motor terminal voltage VM when the FET driving method explained above is employed will be explained with reference to FIG. 2 showing the circuit diagram and FIG. 4 showing a relationship among the operating condition of FET, motor terminal voltage VM and motor current I.

In the mode A, since both FET1 and FET3 are in the ON state, terminal voltage VM of motor M becomes equal to a battery voltage Vb. A motor current i(A) flows, as indicated by a solid line in FIG. 2, the path [FET1]→[motor M]→[FET3]→[resistor $R_R$] and is detected by detecting a voltage drop at the resistor $R_R$ with an operation amplifier $OP_R$ of a current detecting circuit.

In the mode B, since FET1 is OFF, FET3 is ON, a terminal voltage VM of motor M becomes zero. Therefore, magnetic energy stored in the motor is converted to electric energy and a current i(B) flows, as indicated by a chain line in FIG. 2, the path [motor M]→[FET3]→[resistor $R_R$]→[resistor $R_L$]→[recovery diode DT4 added to FET4]→[motor M]. A motor current i(B) is detected by detecting a voltage drop at the resistor $R_R$ with an operational amplifier $OP_R$ of the current detecting circuit. In this case, since the operational amplifier $OP_L$ for detecting a voltage drop of the resistor $R_L$ is a unipolar power supply (single-sided power source) and cannot detect the current flowing in the inverse direction, the detected current value of the operational amplifier $OP_L$ becomes zero.

In the mode C, as shown in FIG. 3, since both FET1 and FET3 are OFF, a current circuit, [resistor $R_L$]→[recovery dose DT4 added to FET4]→[motor M]→[recovery diode DT2 of FET2]→[power supply] is formed and terminal voltage VM of motor M becomes equal to a battery voltage of the negative direction −Vb. In this case, since magnetic energy stored in the motor M is converted to electric energy, a current i(C) flows in the direction opposed to the terminal voltage −Vb of the motor M. In this case, since an operational amplifier $OP_L$ of the current detecting circuit to detect voltage drop across the resistor $R_L$ is a unipolar power supply (single-sided power supply), it cannot detect the current flowing in the inverse direction and thereby the detected current value of the operational amplifier $OP_L$ becomes zero.

Therefore, a motor current I actually flowing into the motor M through each stage of the mode A, mode B, mode C during one cycle of the PWM signal can be expressed by the following equation (8).

$$I=i(A)+i(B)+i(C) \quad (8)$$

On the other hand, a total of the detected current i (dct) detected by the current detecting circuit can be expressed by the equation (9) since the current i(C) is not detected.

$$i(dct)=i(A)+i(B) \quad (9)$$

The period for detecting the current i(dct) during one cycle of the PWM signal is equal to the period of mode A and mode B during one cycle of the PWM signal and this period corresponds to the duty ratio D2 (FIGS. 4(a), 4(b)). Therefore, the current i(dct) can be expressed by the equation (10).

$$i(dct)=D2\cdot I \quad (10)$$

Therefore, the actual motor current I flowing into the motor M can be expressed by the equation (11) by transforming the equation (10).

$$I=i(dct)/D2 \quad (11)$$

FIG. 4(e) shows an example indicating the changing condition of the motor current I in each stage of the mode A, mode B and mode C. In this figure, the changing condition is gradually approximated to the balanced condition with passage of time and the detected motor current i(dct) is converged to I.

Next, estimation of motor terminal voltage VM will be explained. When the motor is driven in the duty ratio D, since a battery voltage is applied across the terminals of motor in the time ratio determined by the duty ratio D, the motor terminal voltage VM can be expressed as VM=D1·Vb (where, Vb=battery voltage).

In the present invention, as shown in FIG. 4(c), a motor terminal voltage VM becomes equal to a sum of the battery voltage Vb applied during the driving period t(A) of the mode A driven by the duty ratio D1 and the negative battery voltage (−Vb) applied during the driving period t(C) of the mode C driven by the duty ratio D2.

As will be apparent from FIG. 4(a), the ratio of the mode A in one cycle of the PWM signal is D1 and the ratio of the mode C can be expressed by (1−D2), the motor terminal voltage VM can be expressed by the following equation (10).

$$VM = D1 \cdot Vb + (1 - D2) \cdot (-Vb) \qquad (12)$$
$$= (D1 + D2 - 1)Vb$$

Using the equation (12), the motor terminal voltage VM can easily be obtained from the battery voltage Vb and duty ratios D1, D2, without requiring a means for detecting the motor terminal voltage.

As explained above, a motor current I can be expressed by the equation (11) and a motor terminal voltage VM can be expressed by the equation (12). Accordingly, a motor angular velocity ω (estimated value) can be obtained by substituting the motor current I and motor terminal voltage VM into the equation (7).

Figure 5:
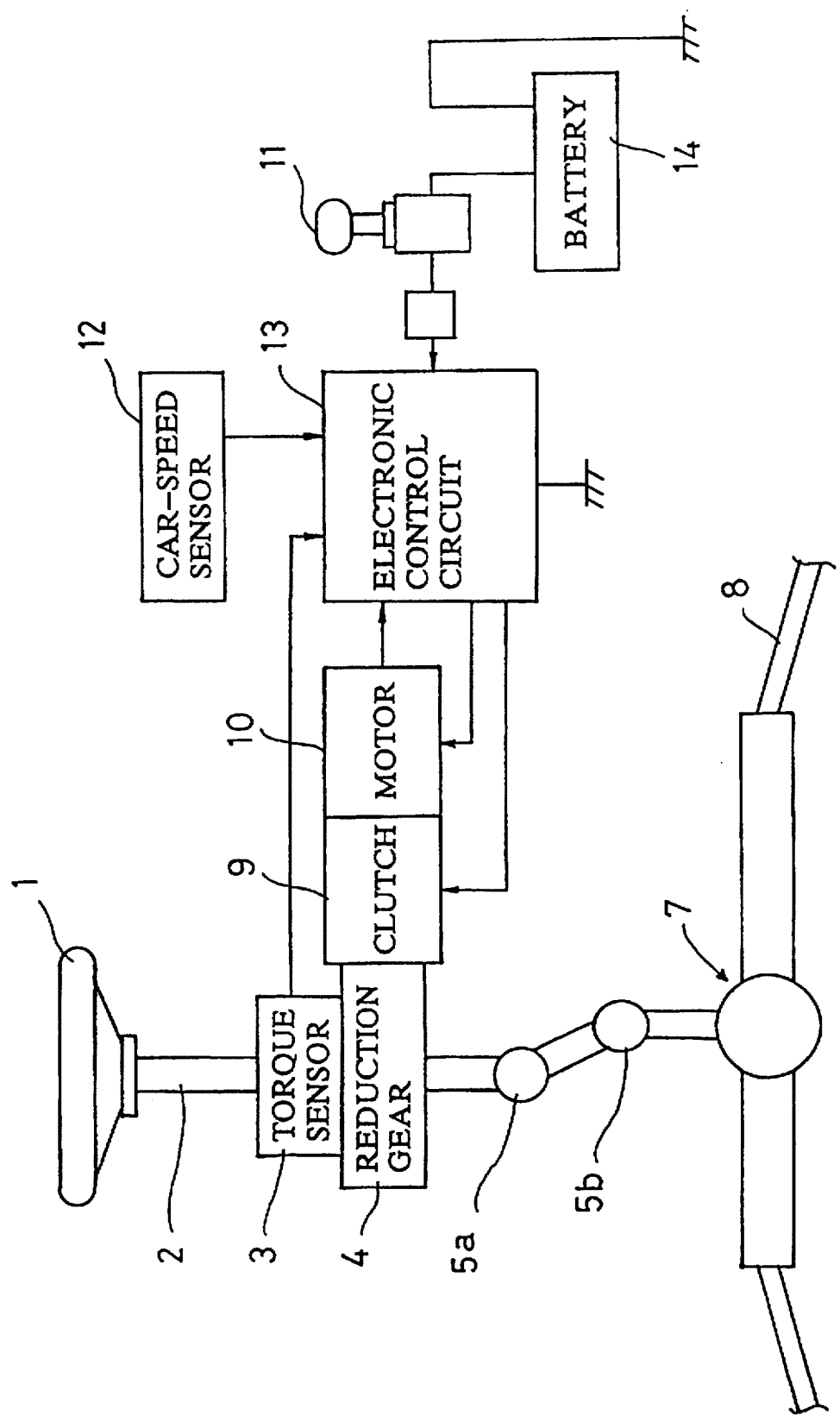
FIG. 5 is a diagram for explaining outline of a structure of an electric power steering system.

Next, referring to FIG. 5 and FIG. 7, outline of the electric power steering system which is suitable for implementation of the present invention will be explained. FIG. 5 illustrates a schematic diagram for explaining a structure of the electric power steering system. A shaft 2 of the steering wheel 1 is coupled with tie rods 8 of the steering wheels through a reduction gear 4, universal joints 5a, 5b and a pinion rack mechanism 7. The shaft 2 is also provided with a torque sensor 3 to detect the steering torque of the shaft 2, and a motor 10 for aiding the steering operation is coupled with the shaft 2 through a clutch 9 and the reduction gear 4.

An electronic control circuit 13 for controlling the power steering system receives an electrical power from the battery 14 through a relay operated by an ignition key 11. The electronic control circuit 13 computes a value of steering force assisting command from a steering torque detected by the torque sensor 3 and car speed detected by a car-speed sensor 12 and controls a current to be supplied to the motor 10 on the basis of the calculated steering force assisting command value.

The clutch 9 is controlled by the electronic control circuit 13. The clutch 9 is coupled under the normal operating condition and it is decoupled when failure of the power steering system is judged by the electronic control circuit 13 and when the power is turned OFF.

Figure 6:
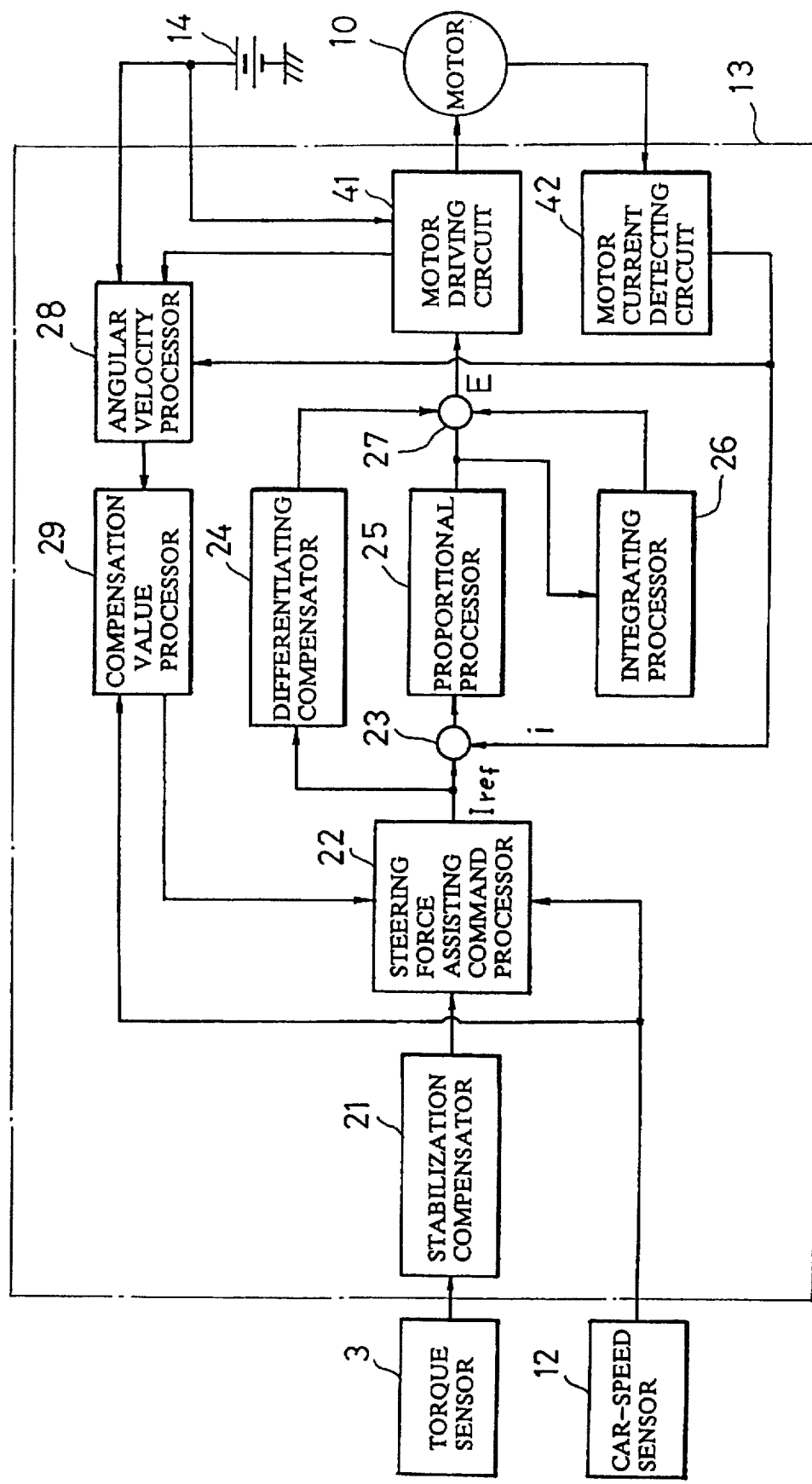
FIG. 6 is a block diagram of an electronic control circuit of an electric power steering system.

FIG. 6 is a block diagram of the electronic control circuit 13. In this embodiment, the electronic control circuit 13 is mainly composed of CPU and the functions executed by the program in CPU are indicated here. For instance, a stabilization compensator 21 is not the stabilization compensator as an independent hardware but is the stabilizing compensator executed by CPU.

Functions and operations of the electronic control circuit 13 will be explained. A steering torque signal inputted from the torque sensor 3 is compensated for stabilization in order to enhance stabilization of the steering system in the stabilization compensator 21 and is then inputted to a steering force assisting command processor 22. Moreover, a car speed detected by the car-speed sensor 12 is also inputted to the steering force assisting command processor 22.

The steering force assisting command processor 22 calculates a steering force assisting command value Iref, which is the current control target value supplied to the motor 10, by the predetermined equation on the basis of the steering torque signal inputted and compensated for stabilization and the car speed signal. The steering force assisting command Iref is compensated by the compensation value outputted from a compensation value processor 29 explained later.

A circuit composed of a differentiating compensator 24, a proportional processor 25, an integrating processor 26 and an adder 27 executes feedback control to obtain the motor current i matched with the steering force assisting command value Iref.

In the comparator 23, the steering force assisting command value Iref which is the control target value calculated by the steering force assisting command processor 22 is compared with a motor current i(dec) detected by the motor current detecting circuit 42 explained later.

In the proportional processor 25, a value proportional to a difference between the steering force assisting command value Iref and motor current i(dct) is outputted. Moreover, an output signal of the proportional processor 25 is integrated in the integrating processor 26 to improve characteristics of the feedback system and a proportional value of the integral value of the difference can be outputted.

The differentiating compensator 24 outputs a differential value of the steering force assisting command value Iref to increase a response speed of the motor current i(dct) for the steering force assisting command value Iref.

A differential value of the steering force assisting command value Iref outputted from the differentiating compensator 24, a value proportional to difference between the steering force assisting command value Iref outputted from the proportional processor 25 and motor current i(dct) and an integral value outputted from the integrating processor 26 are added in the adder 27 and a current control value E which is the operation result is then outputted to the motor driving circuit 41. A current flowing into the motor is detected by the motor current detecting circuit 42 and is then fed back to the comparator 23.

An angular velocity processor 28 receives the duty ratios D1 and D2 of the PWM signal to be described later and outputted from the motor control circuit 41, a detected value i(dct) of the motor current and a battery voltage Vb as the input, calculates an estimate value of motor angular velocity ω.

Moreover, the compensation value processor 29 calculates a compensation value for compensating the steering force assisting command value corresponding to car speed detected by the car-speed sensor 12 and motor angular velocity ω calculated by the angular velocity processor 28 and then outputs this value to the steering force assisting command value processor 22. The compensation value may be determined experimentally on the basis of the vehicle speed and angular velocity.

Figure 7:
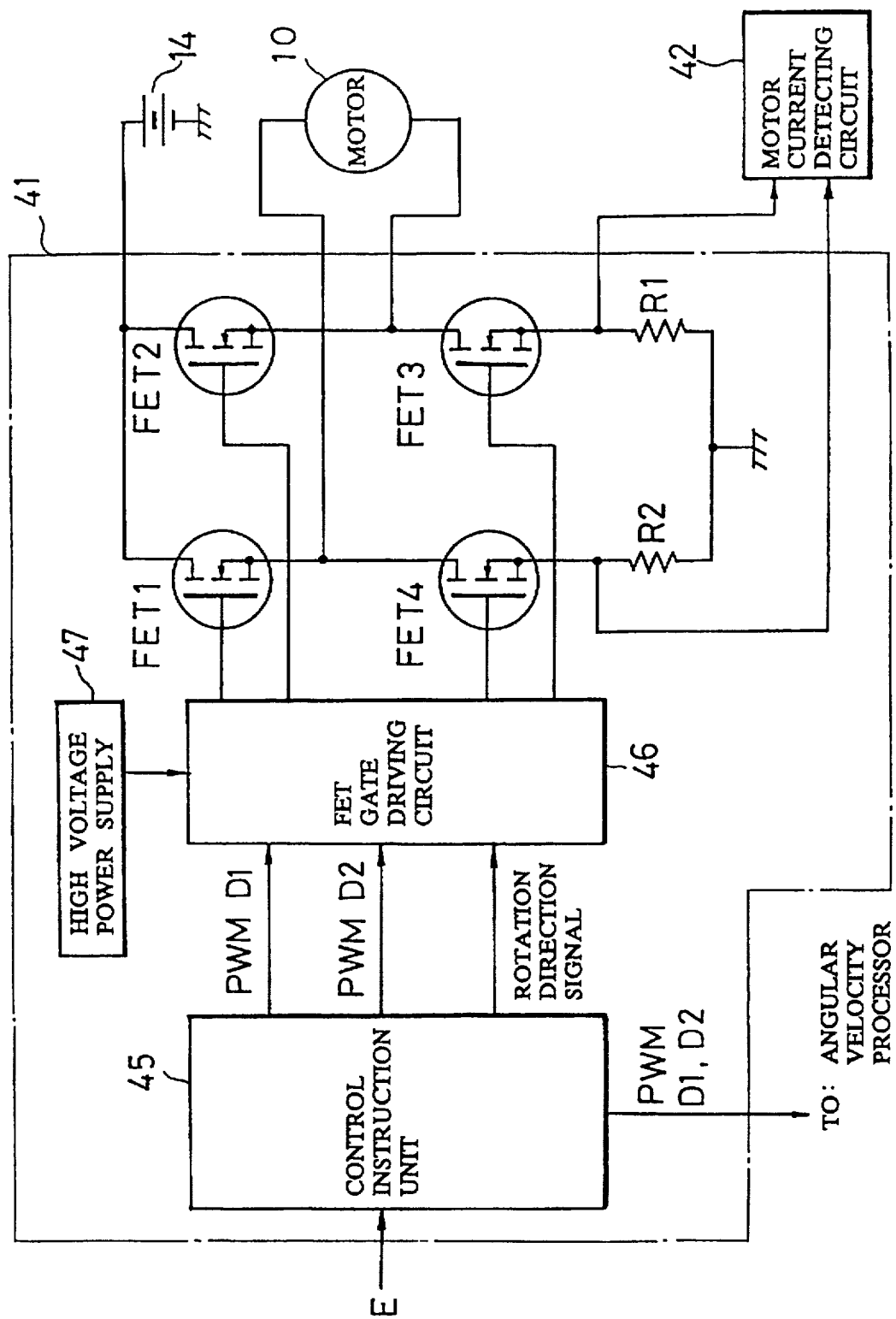
FIG. 7 is a circuit block diagram showing a structure of a motor drive circuit.

FIG. 7 shows an example of the structure of the motor driving circuit 41. The motor driving circuit 41 is composed of an H bridge circuit or the like consisting of a control instruction unit 45, FET gate driving circuit 46, FET1 to FET4 and the control instruction unit 45 outputs the PWM signal for driving FET1 to FET4 on the basis of the current control value E inputted from the adder 27 and a rotation direction signal for instructing the motor rotating direction.

The gate of FET1 (FET2) is controlled for ON and OFF on the basis of the PWM signal of the duty ratio D1 outputted from the control instruction unit 45, while the gate of FET3 (FET4) is controlled for ON and OFF on the basis of the PWM signal of the duty ratio D2 to actually control the amplitude of the motor current I.

Any one to be driven of FET1 and FET2, or any one to be driven of FET3 and FET4 is determined by the rotation direction signal which determines the rotating direction of the motor.

A motor current detecting circuit 42 detects amplitude of the forward (positive) current on the basis of the voltage drop across the resistor R1, while detects amplitude of the backward (negative) current on the basis of the voltage drop across the resistor R2. The detected motor current i is inputted through feedback to the comparator 23.

Figure 8:
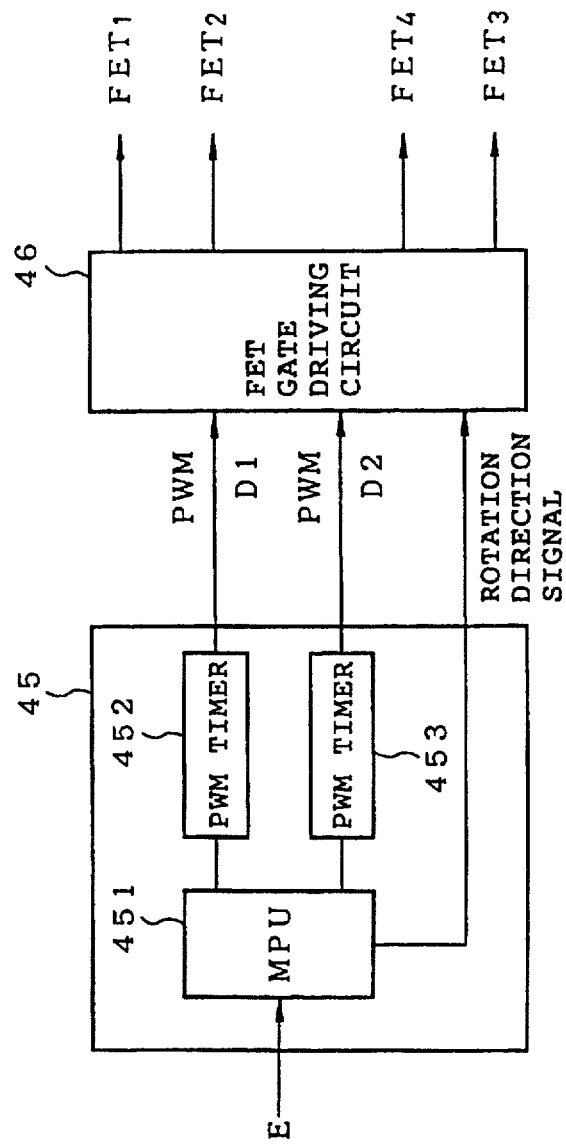
FIG. 8 is a circuit block diagram showing a structure of a first example of a control instruction unit.

Next, a structure of the control instruction unit 45 will be explained. FIG. 8 is an embodiment of the control instruction unit and is composed of a microprocessor 451 and a couple of PWM timers 452, 453. In this structure, the PWM timer 45 is operated on the basis of the input current control value E to output the PWM signal D1 having the duration of the duty ratio D1 and also inputs the PWM signal D1 to the microprocessor in order to calculate the duty ratio D2 based on the equation (2) explained previously and calculates the PWM signal D2 having the duration of the duty ratio D2 by operating the PWM timer 453.

Figure 9:
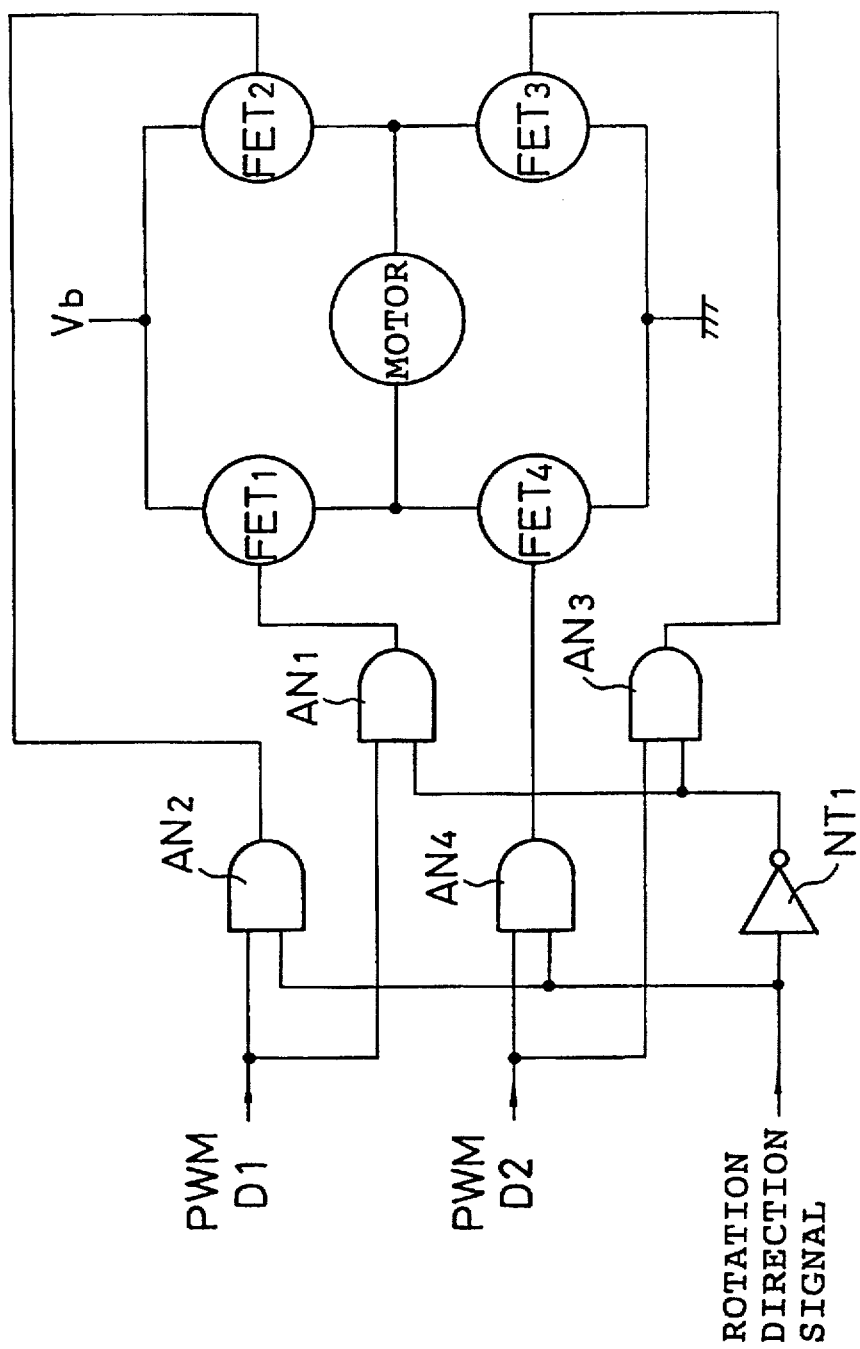
FIG. 9 is a circuit block diagram showing an example of a structure of a gate drive circuit.

The FET gate driving circuit 46 is represented, for example, by a circuit composed of four AND circuits AN1 to AN4 and one NOT circuit NT1 as shown in FIG. 9.

According to this circuit, when it is assumed that the rotation direction signal is ON (for example, indicating the rotation of positive direction) and the PWM signals D1 and D2 are inputted, FET2 is driven with an output of the AND circuit AN2 and FET4 is driven with an output of the AND circuit AN4. In this case, since an output of the NOT circuit NT1 is OFF, the AND circuits AN1 and AN3 do not provide any output and FET1, FET3 are turned OFF.

When it is assumed that the rotating direction signal is OFF (for example, indicating the rotation of negative direction) and the PWM signals D1 and D2 are inputted, since an output of the NOT circuit NT1 becomes ON, FET1 is driven with an output of the AND circuit AN1 and FET3 is also driven with an output of the AND circuit AN3. In this case, the AND circuits AN2 and AN4 do no provide any output and FET1, FET4 are turned OFF.

Figure 10:
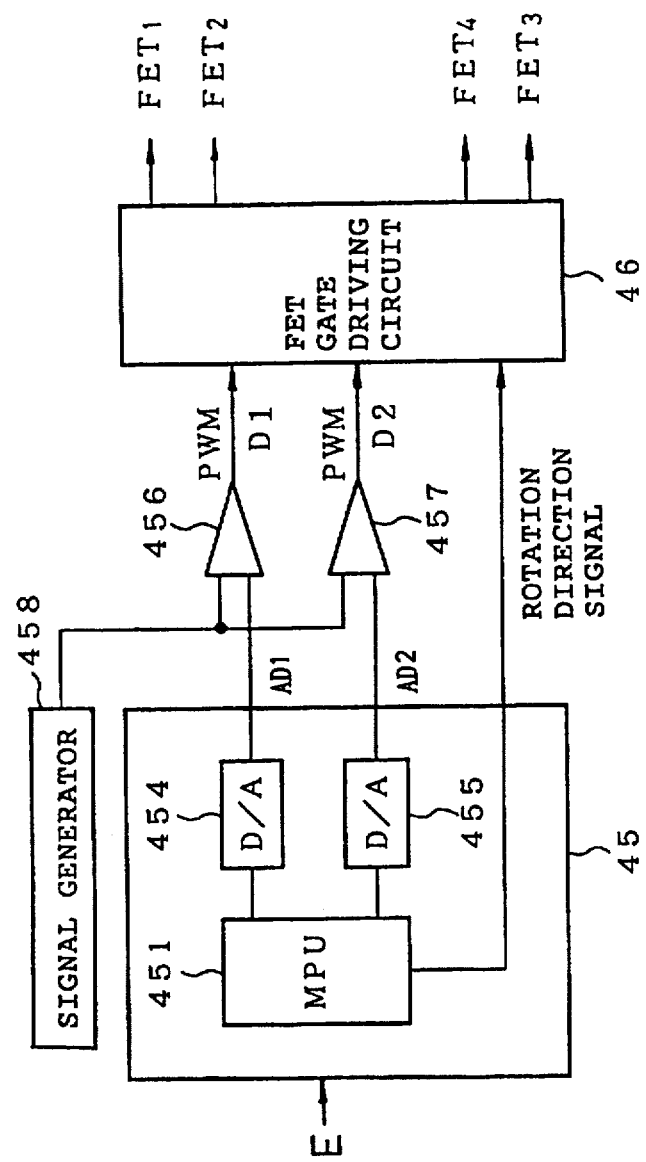
FIG. 10 is a circuit block diagram showing a structure of a second example of a control instruction unit.

FIG. 10 is a second example of the control instruction unit which is composed of a microprocessor 451, a couple of D/A converters 454, 455, a couple of comparators 456, 457 and a signal generator 458.

Figure 11:
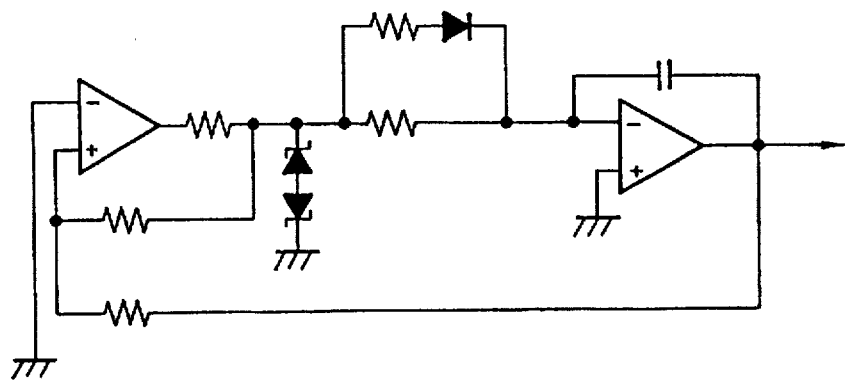
FIG. 11 is a circuit block diagram showing an example of a structure of a sawtooth wave signal generating circuit.
Figure 12:
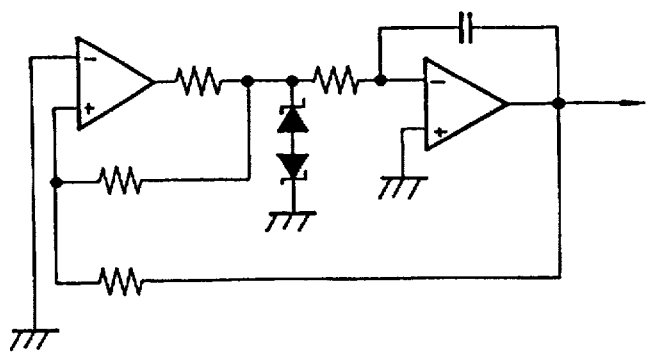
FIG. 12 is a circuit block diagram showing an example of a structure of a triangular wave signal generating circuit.
Figure 13:
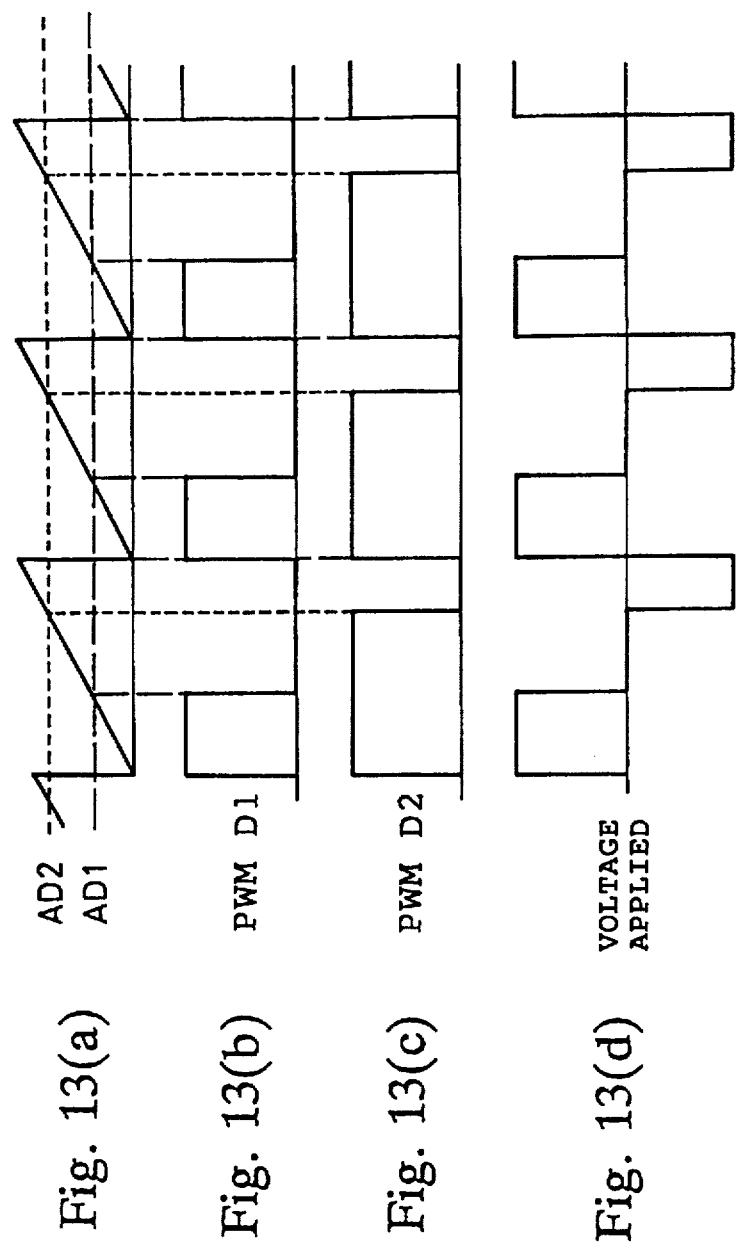
FIGS. 13(a), 13(b), 13(c), and 13(d) are diagrams for explaining the sawtooth wave signal waveform, duty ratio of PWM signal and motor voltage in the second example of the control instruction unit.
Figure 14:
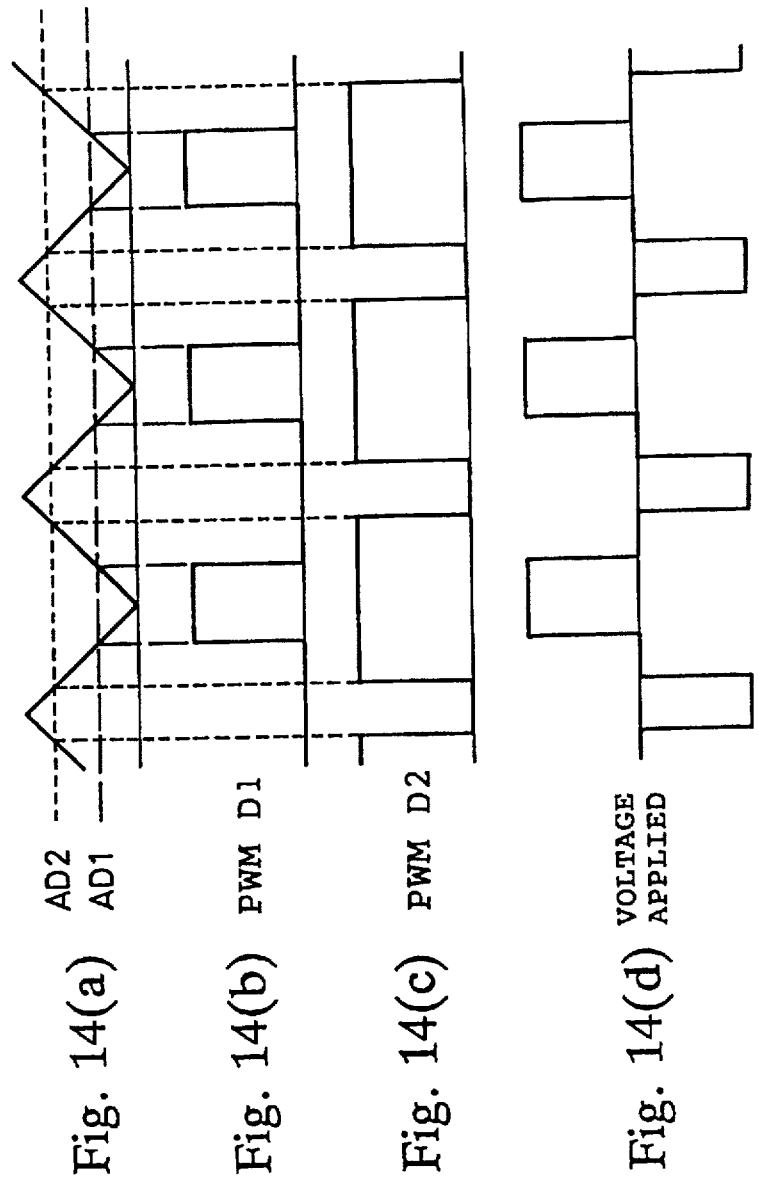
FIGS. 14(a), 14(b), 14(c), and 14(d) are diagrams for explaining the triangular wave signal waveform, duty ratio of PWM signal and motor voltage in the second embodiment of the control instruction unit.

In this structure, an analog signal AD1 corresponding to the duty ratio D1 is obtained on the basis of the input current control value E and a corresponding analog signal AD2 is obtained on the basis of the duty ratio D2 obtained as a result of the arithmetic operation of the equation (2), the sawtooth wave signal or triangular wave signal in the wavelength corresponding to one cycle of the PWM signal outputted from the signal generator 458 by means of the comparators 456, 457 are compared with the analog signals AD1 and AD2, and the PWM signal D1 and PWM signal D2 of the duration corresponding to the voltages of the analog signals AD1 and AD2 are outputted. FIG. 11 shows an example of the sawtooth wave signal generating circuit and FIG. 12 shows an example of the triangular wave signal generating circuit. However, since the signal generating circuit is well known and explanation thereof is omitted.

FIGS. 13(a), 13(b), 13(c), and 13(d) show the waveforms of the sawtooth wave signal outputted from the signal generator 458 by means of the comparators 456, 457, the PWM signals D1 and D2 outputted by comparison of the analog signals AD1, AD2 and the voltage applied to the motor. FIGS. 14(a), 14(b), 14(c), and 14(d) shows the waveforms of the triangular wave signal, PWM signals D1 and D2 outputted through comparison of the analog signals AD1, AD2 and the voltage applied to the motor. Although it is apparent from comparison of FIG. 9 and FIG. 10, there is a deviation between the rising positions of the PWM signals D1 and D2 in the case of triangular wave signal, and therefore the waveform of voltage applied to the motor is also different, but there is no substantial difference in the operation.

Figure 15:
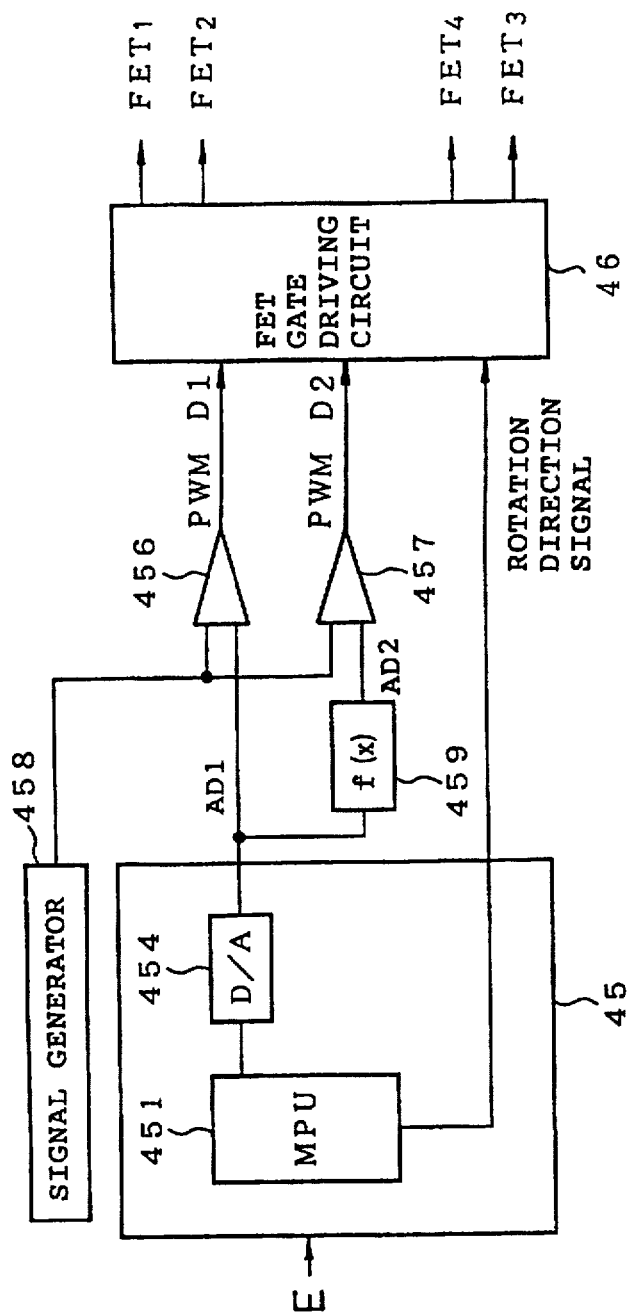
FIG. 15 is a circuit block diagram showing a structure of a third example of the control instruction unit.

FIG. 15 shows a third example of the control instruction unit which is composed of a microprocessor 451, a D/A converter 454, a duty function generator 459, a couple of comparators 456, 457 and a signal generator 458.

Figure 16:
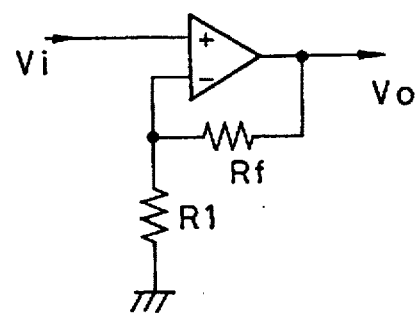
FIG. 16 is a circuit block diagram showing an example of a duty function generator of a third example of the control instruction unit.
Figure 17:
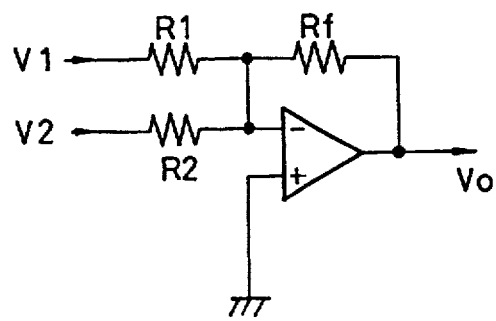
FIG. 17 is a circuit block diagram showing an example of a duty function generator of a third example of the control instruction unit.

In this structure, an analog signal AD1 corresponding to the duty ratio D1 is obtained on the basis of the input current control value E, an analog signal AD2 corresponding to the duty ratio D2 is obtained from an input of the analog signal AD1 in the duty function generator 459 comprising a function generator based on the equation (2), the sawtooth wave signal or triangular wave signal of the wavelength corresponding to one cycle of the PWM signal outputted from the signal generator 458 by means of the comparators 456, 457 is compared with the analog signal AD1 and AD2, and thereby the PWM signal D1 and PWM signal D2 corresponding to the voltages of the analog signals AD1 and AD2 are outputted. The duty function generator 459 is proposed to have a structure attained by combination of the analog circuits using ordinary operational amplifiers as shown, for example, in FIG. 16 and FIG. 17.

The comparators 456, 457 and signal generator 458 are similar to those of the second embodiment and the outputs of the comparators 456, 457 are also similar to that explained with reference to FIGS. 13(a) to 13(d) and FIGS. 14(a) to 14(d) in the second embodiment.

Figure 18:
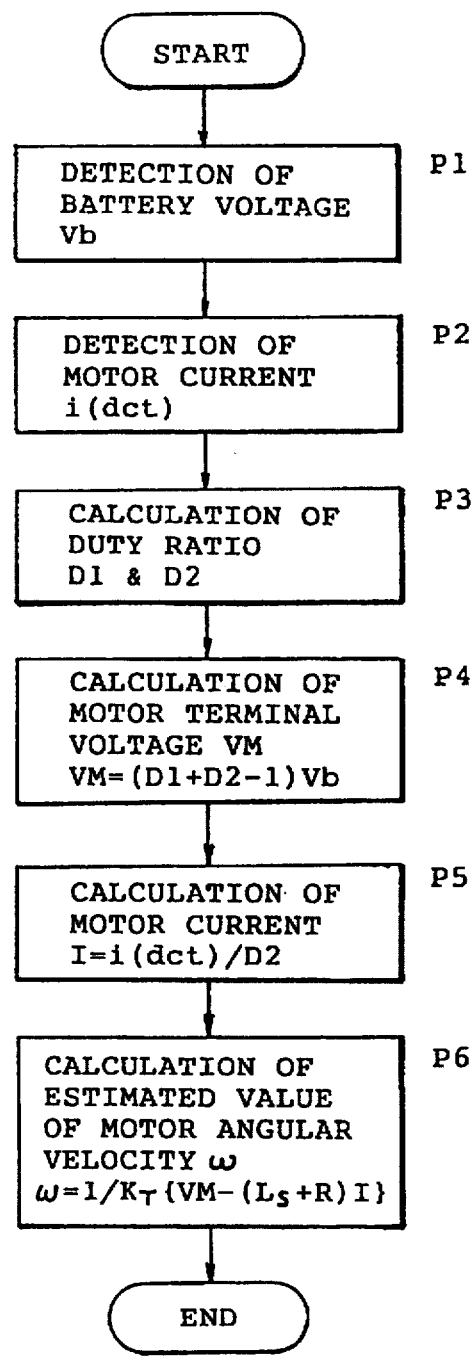
FIG. 18 is a flowchart showing a processing sequence of estimated calculation for angular velocity of motor.

FIG. 18 is a flowchart indicating the processing sequence for calculation of the angular velocity of motor in angular velocity processor 28. First, a battery voltage Vb is detected (step P1) and a motor current i(dct) is detected (step P2). The duty ratios D1 and D2 for driving FET of the motor drive circuit are calculated on the basis of the steering force assisting command value Iref (step P3) and a motor terminal voltage VM is calculated on the basis of the equation (12) (step P4). A motor current i (dct) is compensated by the duty ratio D2 based on the equation (11) to calculate the motor current I (step P5). The estimated value of the motor angular velocity ω is calculated on the basis of the equation (7) (step P6).

Since the term (Ls+R) included in the equation (7) can be easily written in the program using the well known discreting method, the equation (7) can be processed with CPU included in the control unit.

Figures 19A, 19B:
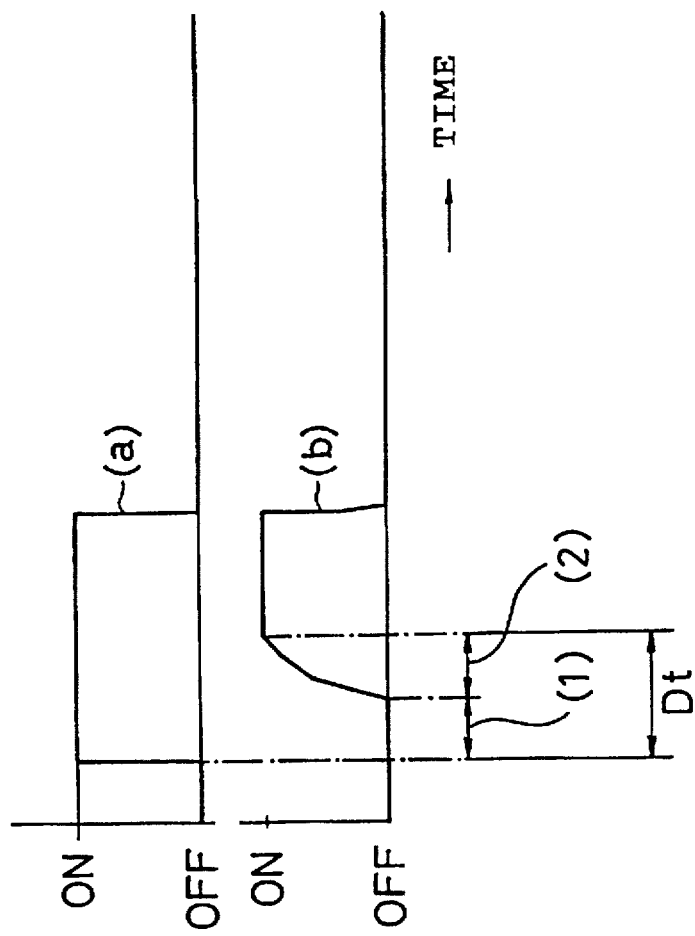
FIGS. 19(a) and 19(b) is a diagram for explaining a time lag between the FET gate drive instruction signal and actual ON/OFF operation of the gate.

In above processing, influence by time lag for driving of FET is neglected. However, as shown in FIG. 19(a), FIG. 19(b), there is a time lag Dt corresponding to a sum of the operational delay (1) of the logical circuit and the operational delay (2) of the FET element between the gate drive instruction signal (a) and the ON/OFF operations of the actual gate (b). Thereby, loss of the effective value of duty ratio D is generated, resulting in an error, although it is only a bit, in the estimated value of the motor terminal voltage VM. The estimated value of the motor terminal voltage VM having compensated for time lag Dt may be expressed below.

Namely, when the duty ratio D2 is always 1, the motor terminal voltage VM is expressed by the following equation (13).

$$VM=(D1-Dt)Vb \tag{13}$$

When the duty ratio D2 is approximated to 1, the motor terminal voltage VM is expressed by the following equation (14).

$$VM=\{(D1-Dt)-Dt\}Vb \tag{14}$$

When the duty ratio D2<1, the motor terminal voltage VM is expressed by the following equation (15).

$$VM = \{(D1 - Dt) + D2 - 1 - Dt\}Vb \qquad (15)$$
$$= \{(D1 + D2 - 1 - 2Dt\}Vb$$

Figures 21A, 21B, 21C:
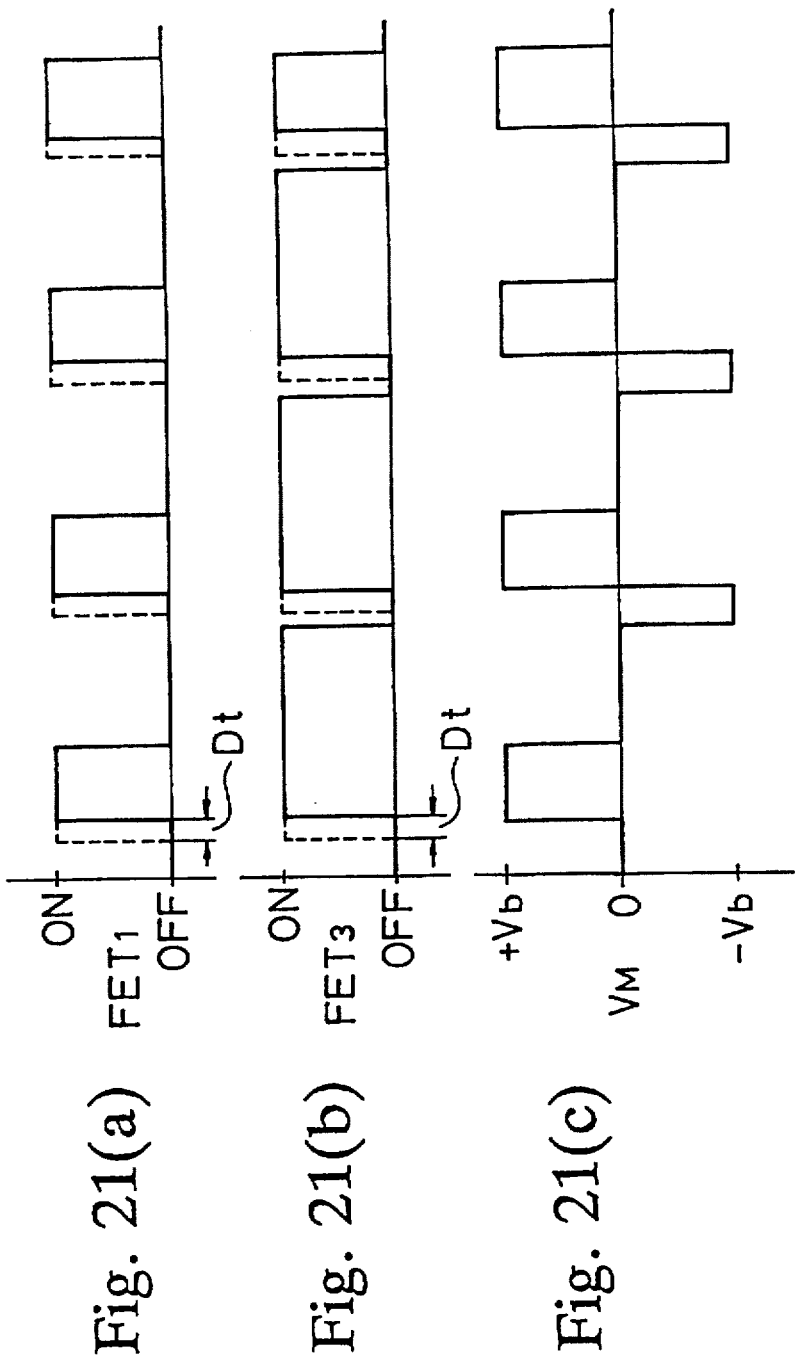
FIGS. 21(a), 21(b), and 21(c) are diagrams for explaining an estimated value of the motor terminal voltage having compensated for time lag (when duty ratio is approximated to 1 ($D_2$=approx. 1)).

FIGS. 20(a), 20(b), and 20(c) show the ON/OFF states of FET1, FET3 and estimated motor terminal voltage VM when the duty ratio D2 of FET3 is always 1, while FIGS. 21(a), 21(b), and 21(c) show the ON/OFF states of FET1, FET3 and estimated motor terminal voltage VM when the duty ratio D2 of FET3 is approximated to 1.

Next, the second embodiment of the control unit of the present invention will be explained.

The second embodiment calculates, on the basis of the current control value, the duty ratio of the PWM signal to drive the semiconductor element and also adjusts the calculated duty ratio with the adjusting value determined on the basis of the motor angular velocity. Therefore, the semiconductor elements forming a motor driving circuit are driven with the PWM signal of the adjusted duty ratio.

Figure 31:
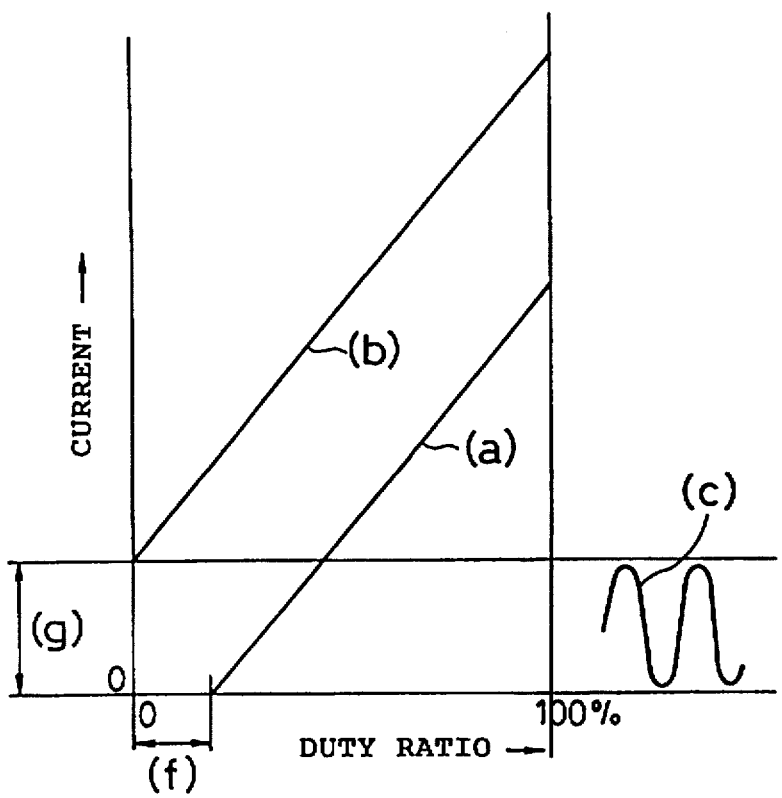
FIG. 31 is a diagram for explaining the discontinuous area of the motor current and dead zone in the relationship between the motor current and duty ratio in the conventional motor control circuit.

Referring to FIG. 31, as explained previously, a relationship between the motor current i and duty ratio D when the steering wheel is returned with a self-aligning torque is shown by the line (b) in FIG. 31, suggesting that the motor current i is not continuous at the area near the point where the duty ratio D becomes zero.

In the first embodiment, to overcome this problem, FET1 (or FET2) is driven with the duty ratio D1 in the area where the value of duty ratio D is smaller than the predetermined value γ and FET3 (or FET4) is driven with the duty ratio D2 which is larger than the duty ratio D1 (longer period). In the area where the value of duty ratio D1 is larger than the predetermined value, FET1 (or FET2) is driven by the duty ratio D1, while FET3 (or FET4) is driven by the known driving method for controlling it to ON/OFF state.

Figure 22:
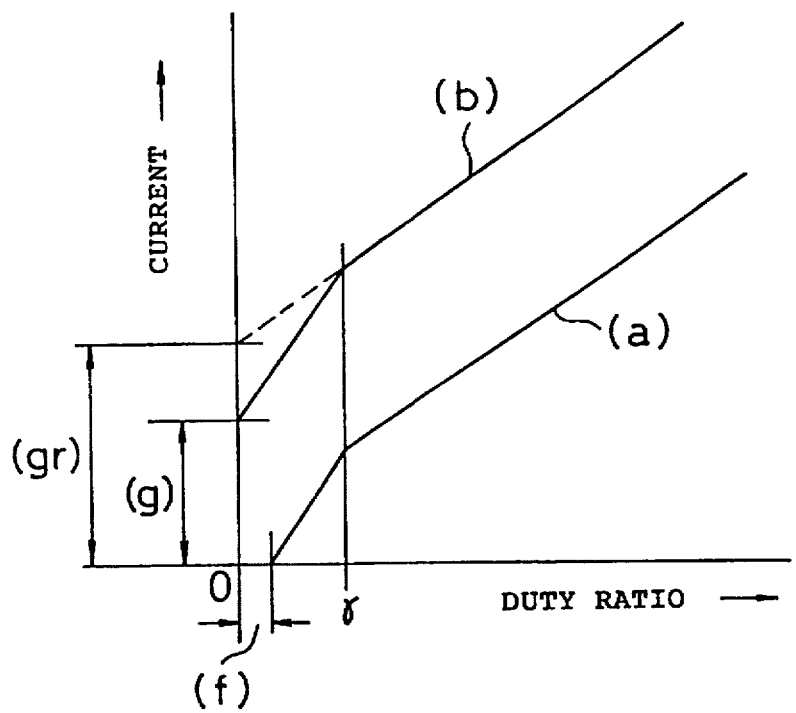
FIG. 22 is a diagram for explaining a relationship between a motor current in the motor control circuit and duty ratio of PWM signal in the second embodiment.

FIG. 22 shows a relationship between the duty ratio D1 and a motor current i in the driving method explained above, namely when FET1 to FET4 are driven by the duty ratio D1 and duty ratio D2 in the area where the duty ratio D is smaller than the predetermined value γ and when FET1 (or FET2) is driven with the duty ratio D1 and FET3 (FET4) is driven by the known driving method to control it to ON/OFF state in the area where the duty ratio D is larger than the predetermined value γ.

In FIG. 22, the line (b) corresponds to the case where the steering wheel is returned with a self-aligning torque. The discontinuous area (g) of the motor current i for the duty ratio D can be set smaller than the discontinuous area (g) in the known driving method indicated by the chain line. However, the dead zone (f) is left in the usual driving condition (steering wheel is not returned) indicated by the line (a).

Figure 23:
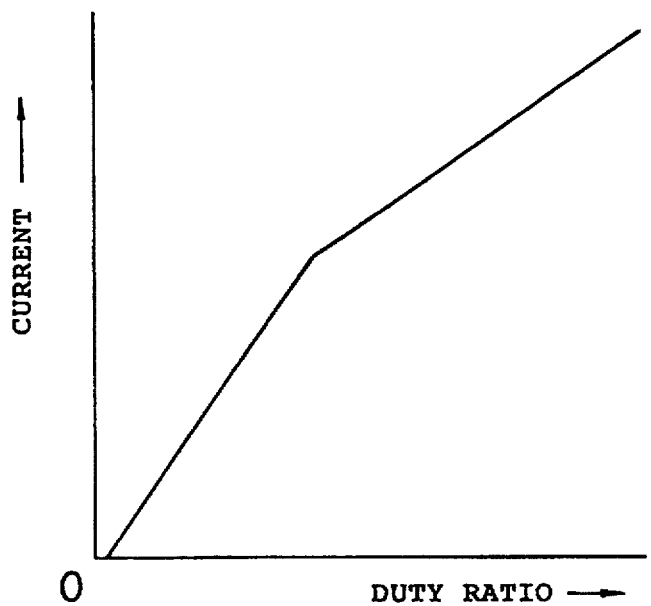
FIG. 23 is a diagram for explaining a relationship between a motor current and duty ratio of PWM signal when the duty ratio is compensated in the second embodiment.

Therefore, in the second embodiment, the duty ratio D1 is adjusted with the dead zone adjusting value to be explained later in order to eliminate the dead zone. FIG. 23 shows an example indicating a relationship between the duty ratio D1 and motor current i in the case that the dead zone has been eliminated by adjusting the duty ratio D1.

A dead zone adjusting value will be explained. For determination of the dead zone adjusting value Dc, two methods have been proposed.

In the first method, the dead zone adjusting value Dc is determined by the following equation (16) as a function of the motor angular velocity ω.

$$Dc = a \cdot \omega + Db \qquad (16)$$

Where,
a: Constant;

ω: Motor angular velocity;
Db: Standard adjusting value;

In the second method, any one of the predetermined two dead zone adjusting values Dn, Dr is selected depending on whether the steering wheel returning condition is detected or not. Namely, the dead zone adjusting value Dn is selected under the usual steering condition and the dead zone adjusting value Dr is selected under the condition of the steering wheel returning with a self-aligning torque.

$$Dc = Dn \text{ (under the usual manual steering condition)} \qquad (17)$$

$$Dc = Dr \text{ (under the steering wheel returning condition)} \qquad (18)$$

The steering wheel returning condition can be judged depending on the motor angular velocity ω and the steering torque. That is, when the absolute value of motor angular velocity ω is larger than the predetermined value and the absolute value of steering torque is smaller than the predetermined value, it can be judged as the steering wheel returning condition because the steering is not performed even when the motor is rotated.

Figure 24:
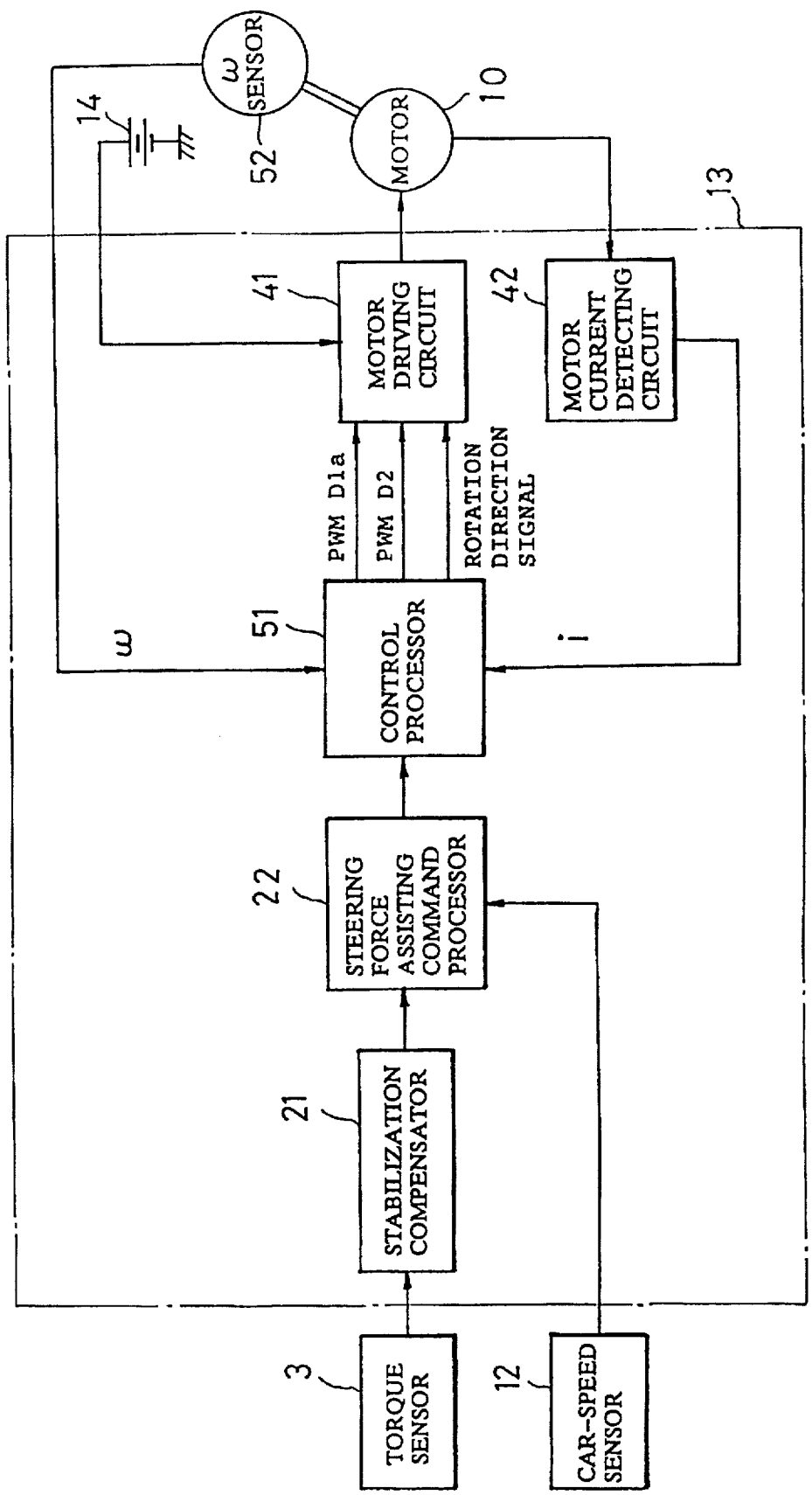
FIG. 24 is a block diagram of an electronic control circuit of an electric power steering system of the second embodiment.

FIG. 24 is a block diagram of the electronic control circuit 13 forming the control unit of the second embodiment. Like the electronic control circuit of the first embodiment explained previously, the control circuit of this embodiment is also mainly composed of CPU and the functions to be executed by the program in the CPU are indicated. The same elements as those of the first embodiment are designated by the same reference numerals and detail explanation of these elements are eliminated.

Functions and operations of the electronic control circuit 13 will be explained below. A steering torque signal inputted from the torque sensor 3 is stabilized and compensated in the stabilization compensator 21 to enhance stability of the steering system and is then inputted to the steering force assisting command processor 22. A car speed detected by the car-speed sensor 12 is also inputted to the steering force assisting command processor 22.

The steering force assisting command processor 22 calculates a steering force assisting command value Iref as a control target value of current to be supplied to the motor 10 with the predetermined equation on the basis of the stabilized and compensated steering torque signal input and the car speed signal.

The control processor 51 calculates the duty ratio D1 and duty ratio D2 of the PWM signal for driving FET1 to FET4 on the basis of the steering force assisting command value Iref and outputs a rotation direction signal instructing the motor rotating direction.

Moreover, the control processor 51 calculates the prescribed dead zone adjusting value Dc using the preset equation on the basis of the motor angular velocity ω detected by the angular velocity sensor 52, adds the dead zone adjusting value Dc calculated above to the duty ratio D1 of the PWM signal and outputs the duty radio D1a and duty ratio D2 of the adjusted PWM signal to the motor control circuit 41.

Here, the control processor 51 is provided with a known feedback control means for executing the control to feed back a detected value i of motor current to follow the steering force assisting command value Iref.

The motor driving circuit 41 and motor current detecting circuit 42 are similar to those in the first embodiment and therefore detail explanation thereof is omitted here.

The motor control processing including the processing to determine, as a function of the motor angular velocity ω, the dead zone adjusting value Dc to be executed by the electronic control circuit 13 will be explained by referring to the flowchart of FIG. 25.

Figure 25:
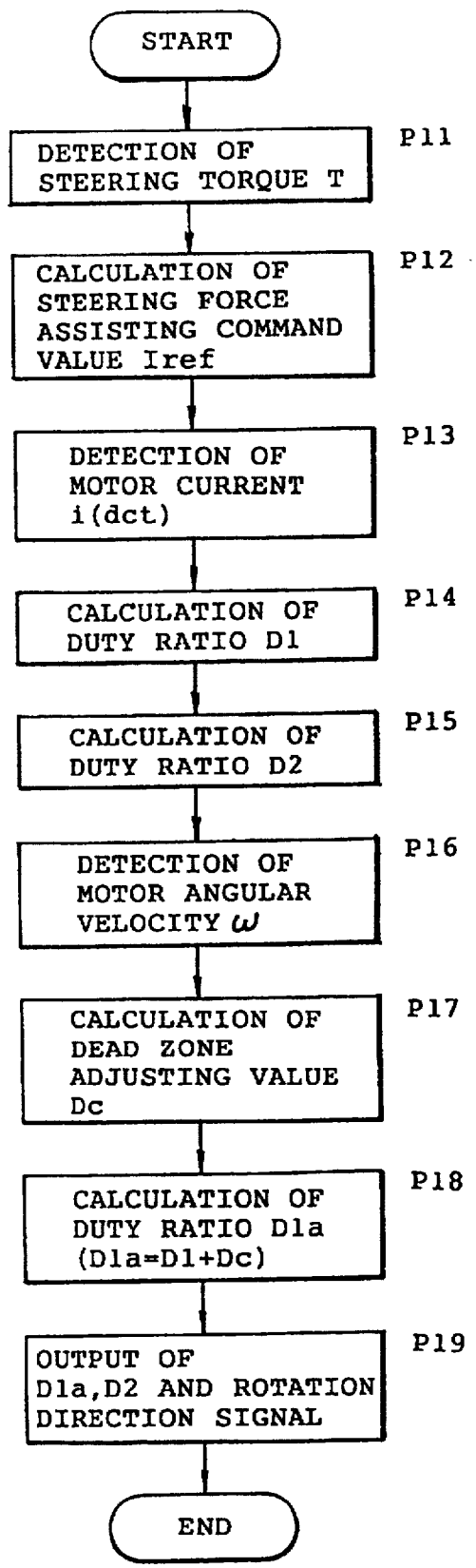
FIG. 25 is a flowchart for explaining motor control by an electronic control circuit of the second embodiment.

In the flowchart of FIG. 25, a steering torque value detected by the torque sensor 3 is read (step P11) to calculate the steering force assisting command Iref (step P12). A motor current value i detected by the motor current detecting circuit 42 is read (step P13) to calculate the motor current control value E and the duty ratios D1 and D2 of the PWM signal on the basis of the steering force assisting command Iref calculated above and the detected motor current value i (steps P14, P15).

A motor angular velocity w detected by the angular velocity sensor 43 is read (step P16), the dead zone adjusting value Dc is calculated by the equation (1) (step P17) and the adjusted duty ratio D1a is calculated by adding the dead zone adjusting value Dc to the duty ratio D1 obtained previously (step P18).

The adjusted duty ratios D1a, D2 and the rotation direction signal determined by the sign of the PWM signal are outputted to the motor control circuit 41 to drive the motor (step P19).

The second embodiment of the present invention has been explained above. Another controlling operation different from that explained above can also be realized by the electronic control circuit 13. The second example of the motor control to be executed by the electronic control circuit 13 will be explained.

The motor control includes the processing for selecting any one of the predetermined two dead zone adjusting values Dn, Dr as the dead zone adjusting value Dc depending on the fact that the steering wheel returning condition is detected or not.

Figure 26:
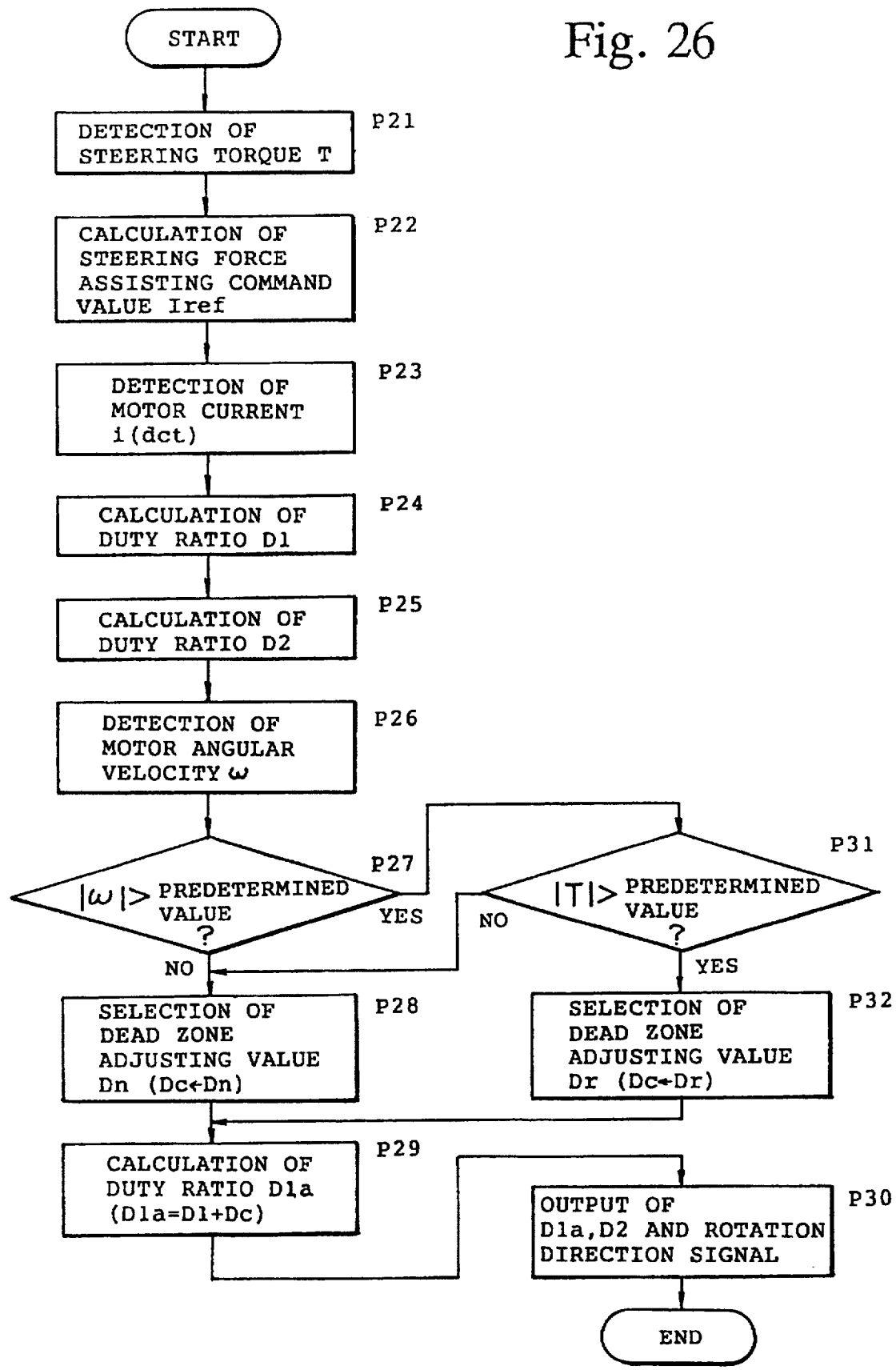
FIG. 26 is a flowchart for explaining the second embodiment of motor control by an electronic control circuit of the second embodiment.
Figure 27:
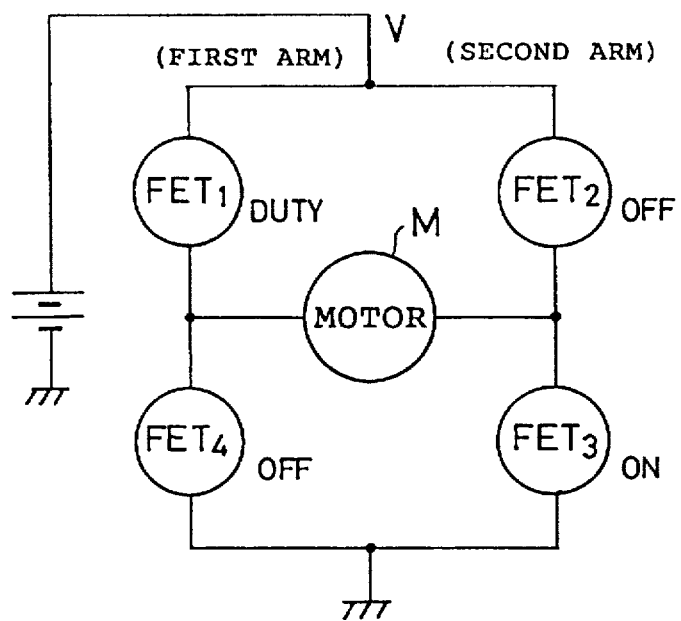
FIG. 27 is a diagram for explaining a conventional motor drive circuit consisting of the H bridge circuit formed of FETs.

FIG. 26 shows a flowchart of the second example of the motor controlling operation. First, a steering torque detected by the torque sensor 3 is read (step P21) to calculate the steering force assisting command Iref (step P22). A motor current value i detected by the motor current detecting circuit 42 is read (step P23) to calculate the motor current control value E on the basis of the previously calculated steering force assisting command value Iref and detected motor current value i and the duty ratios D1 and D2 of the PWM signal (step P24, P25).

A motor angular velocity ω detected by the angular velocity sensor 43 is read (step P26), and judges whether the absolute value of motor angular velocity ω is larger than the predetermined value or not (step P27).

When the absolute value of motor angular velocity ω is smaller than the predetermined value, the usual steering condition is judged. The dead zone adjusting value Dn corresponding to the usual steering operation is selected as the dead zone adjusting value Dc (step P28), and the dead zone adjusting value Dc (=Dn) is added to the duty ratio D1 obtained previously to calculate the adjusted duty ratio D1a (step P29).

A rotating direction signal which is determined by the adjusted duty ratios D1a, D2 and the sign of the PWM signal is outputted to the motor driving circuit 41 to drive the motor (step P30).

When the absolute value of motor angular velocity ω is judged larger than the predetermined value in the step P37, whether the absolute value of steering torque is smaller than the predetermined value or not is judged (step P31). When the absolute value of the steering torque is larger than the predetermined value, the usual steering condition is judged and the processings after the step P28 are started. Meanwhile, when the absolute value of steering torque is judged smaller than the predetermined value in the step P31, the steering wheel returning condition is judged. Thereby, the dead zone adjusting value Dr corresponding to the steering wheel returning condition is selected as the dead zone adjusting value Dc (step P32) and the dead zone adjusting value Dc (=Dr) is added to the duty ratio D1 obtained previously to calculate the adjusted duty ratio D1a (step P29).

In the embodiment of the present invention explained above, an angular velocity sensor is used for detection of motor angular velocity. However, for detection of such motor angular velocity, it can also be estimated and calculated from a motor terminal voltage and motor current when the electric characteristics of motor, that is, motor inductance, motor terminal resistance and back electromotive force constant of motor are determined. In this case, the motor terminal voltage can also be obtained from the battery voltage (power supply voltage) and duty ratio to drive the motor. It is of course possible to apply the method to obtain the motor angular velocity by the estimated calculation to above embodiment.

The estimated calculation of motor angular velocity is appreciated as the effective method not resulting in increase of manufacturing cost because additional members are not required.

Moreover, in above embodiment, a structure for adjusting the duty ratio with the dead zone adjusting value which is the characteristic part of the present invention has been applied to the driving circuit where FET 1 to FET4 are driven by the duty ratios D1 and D2. In the known driving circuit, however, the present invention can also be applied to the driving method where FET1 (or FET2) is driven by the duty ratio D1, while FET3 (or FET4) is driven for ON/OFF condition. In this case, the duty ratio D can be adjusted with the dead zone adjusting value.

As explained above, the control unit of the electric power steering system of the present invention calculates, in order to drive the motor driving circuit constituted by connecting semiconductor elements in the shape of H bridge, the duty ratio of the PWM signal for driving the semiconductor elements on the basis of the current control value, and adjusts the calculated duty ratio with the adjusting value determined on the basis of the motor angular velocity to drive the semiconductor elements with the PWM signal having the adjusted duty ratio. Therefore, the present invention offers following excellent effects, that is, not only generation of noise and instability of feedback control which are easily detected in the steering wheel returning condition as the disadvantages in the motor drive circuit of this kind can be improved but also the feeling of the steering operation at the area near the neutral position of the steering wheel can be improved.

What is claimed is:

1. A control apparatus for an electric power steering system comprising a feedback control means to control an output of a motor for giving a steering assisting force to a steering mechanism in accordance with a value of a current control signal calculated from a steering force assisting command value which is calculated on the basis of a steering torque signal generated at least on a steering shaft and a detected motor current value, said control apparatus for an electric power steering system comprising:

motor driving means connecting a power supply across the input terminals of an H bridge circuit formed by connecting four semiconductor elements and connecting said motor across the output terminals of said H bridge, in which two semiconductor elements form a pair constituting a first arm and a second arm; and control means for driving semiconductor elements of said first arm by the PWM signal having a first duty ratio determined on the basis of said current control value and semiconductor elements of said second arm by the PDM signal having a second duty ratio defined by the function of said first duty ratio.

2. A control apparatus for an electric power steering system according to claim 1, wherein said motor current detecting value fed back to said feedback control means is a motor current detecting value compensated by said second duty ratio.

3. A control apparatus for an electric power steering system according to claim 1, further comprising:

motor angular velocity estimating means for estimating an angular velocity on the basis of a battery voltage, motor terminal voltage estimated on the basis of said first duty ratio and second duty ratio and motor current detecting value compensated by said second duty ratio.

4. A control apparatus for an electric power steering system comprising a feedback control means to control an output of a motor for giving, a steering assisting force to a steering mechanism in accordance with a value of current control signal calculated from a steering, force assisting command value which is calculated on the basis of a steering torque signal generated at least on a steering, shaft and a detected motor current value, said control apparatus for an electric power steering system comprising:

motor driving means connecting a power supply across the input terminals of an H bridge circuit formed by connecting four semiconductor elements and connecting said motor across the output terminals of said H bridge in which two semiconductor elements form a pair constituting a first arm and a second arm; and control means for driving the semiconductor elements of said first arm by said first PWM signal having a first duty ratio determined on the basis of said current value and semiconductor elements of said second arm by the PWM signal having a second duty ratio defined by the function of said first duty ratio and outputting said first PWM signal and said second PWM signal to said motor driving means independently.

5. A control apparatus for an electric power steering system according to claim 4, said control means comprising:

means for calculating a first duty ratio on the basis of said current control value and calculating a second duty ratio on the basis of the predetermined equation as the function of the first duty ratio;

means for outputting the first PWM signal of the first duty ratio by inputting a value of said first duty ratio; and means for outputting the second PWM signal of the second duty ratio by inputting a value of said second duty ratio.

6. A control apparatus for an electric power steering system according to claim 5, wherein said predetermined equation is expressed below $$D2=a \cdot D1+b$$

Where,

D2: Second duty ratio;

D1: First duty ratio;

a, b: Constants.

7. A control apparatus for an electric power steering system according to claim 4, said control means comprising:

means for calculating a first duty ratio in digital data on the basis of said current control value and also calculating a second duty ratio in digital data with the predetermined equation by inputting the value of the first duty ratio;

means for converting the digital data of the first duty ratio and the digital data of the second duty ratio outputted from said calculating means into analog data of the first duty radio and second duty ratio;

signal generating means for generating a sawtooth wave or a triangular wave signal having a wavelength corresponding to one cycle of a PWM signal; and PWM signal output means for converting the waveform signal outputted from said signal generating means to a first PWM signal having the duration corresponding to a voltage of the analog signal of the first duty ratio and the waveform signal of the second duty ratio to a second PWM signal of the duration corresponding to the voltage of the analog signal of the second duty ratio.

8. A control apparatus for an electric power steering system according to claim 4, further comprising:

means for calculating a value of a first duty ratio in digital data on the basis of said current control value;

function signal generating means for generating the analog signal of a second duty ratio on the basis of the digital data of the first duty ratio;

means for converting the digital data of the first duty ratio into an analog data of the first duty ratio;

signal generating means for generating a sawtooth wave or a triangular wave signal of a wavelength corresponding to one cycle of the PWM signal; and PWM signal converting means for converting the waveform signal outputted from said signal generating means into a first PWM signal having a duration corresponding to a voltage of the analog signal of said first duty ratio and into the second PWM signal having a duration corresponding to the voltage of the analog signal of said second duty ratio.

9. A control apparatus for an electric power steering system comprising a feedback control means to control an output of a motor for giving a steering assisting force to a steering mechanism in accordance with a value of a current control signal calculated from a steering force assisting command value which is calculated on the basis of a steering torque signal generated at least on a steering shaft and a detected motor current value, said control apparatus for an electric power steering system; comprising:

motor driving means connecting a power supply across the input terminals of an H bridge circuit formed by connecting four semiconductor elements and said motor across the output terminals of said H bridge;

calculating means for calculating a duty ratio of a PWM signal on the basis of a current control signal;

motor angular velocity detecting means; and duty ratio adjusting means for adjusting calculated duty ratio of the PWM signal with an adjusting value which is determined based on the detected motor angular velocity.

10. A control apparatus for an electric power steering system according to claim 9, wherein said adjusting value is expressed below:

$$Dc=a\omega+Db$$

Where,

Dc: adjusting value

Db: constant (standard adjusting value)

ω: motor angular velocity a: constant.

* * * * *

UNITED STATES PATENT AND TRADEMARK OFFICE
CERTIFICATE OF CORRECTION

PATENT NO. : 5,801,504
DATED : September 1, 1998
INVENTOR(S) : Shuji Endo, et al.

It is certified that error appears in the above-identified patent and that said Letters Patent is hereby corrected as shown below:

Col. 16, line 64, delete "PDM", and insert therefor --PWM--.

Col. 17, line 13, delete comma (,) after "giving".

Col. 17, line 15, delete comma (,) after "steering".

Col. 17, line 17, delete comma (,) after "steering".

Col. 18, line 56, delete "Dc=aω+Db" and insert therefor --Dc=α•ω+Db--.

Signed and Sealed this

First Day of December, 1998

BRUCE LEHMAN

Attest:

Attesting Officer

Commissioner of Patents and Trademarks